United States Patent
Arikawa

(10) Patent No.: US 10,170,120 B2
(45) Date of Patent: Jan. 1, 2019

(54) CALL MANAGEMENT SYSTEM AND ITS SPEECH RECOGNITION CONTROL METHOD

(71) Applicant: Hitachi Information & Telecommunication Engineering, Ltd., Kanagawa (JP)

(72) Inventor: Hidehisa Arikawa, Nakai (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 0 days.

(21) Appl. No.: 15/617,188

(22) Filed: Jun. 8, 2017

(65) Prior Publication Data

US 2018/0012600 A1    Jan. 11, 2018

(30) Foreign Application Priority Data

Jul. 8, 2016  (JP) ................................ 2016-135812

(51) Int. Cl.
| | |
|---|---|
| *G10L 15/00* | (2013.01) |
| *G10L 15/28* | (2013.01) |
| *G10L 15/183* | (2013.01) |
| *G10L 15/30* | (2013.01) |
| *H04M 3/42* | (2006.01) |
| *H04M 3/51* | (2006.01) |
| *G10L 15/08* | (2006.01) |

(52) U.S. Cl.
CPC .......... *G10L 15/285* (2013.01); *G10L 15/183* (2013.01); *G10L 15/30* (2013.01); *H04M 3/42221* (2013.01); *H04M 3/5175* (2013.01); *G10L 2015/088* (2013.01); *H04M 2201/40* (2013.01); *H04M 2201/60* (2013.01); *H04M 2203/551* (2013.01)

(58) Field of Classification Search
CPC ......... H04M 3/51; G10L 15/26; G10L 15/265
USPC ....................................................... 704/251
See application file for complete search history.

(56) References Cited

U.S. PATENT DOCUMENTS

| | | | |
|---|---|---|---|
| 6,724,887 B1 * | 4/2004 | Eilbacher ............ | H04M 3/5183 379/265.02 |
| 2005/0049880 A1 * | 3/2005 | Roth ....................... | G10L 15/19 704/277 |

(Continued)

FOREIGN PATENT DOCUMENTS

JP          2015-177411 A       10/2015

*Primary Examiner* — Daniel Abebe
(74) *Attorney, Agent, or Firm* — Mattingly & Malur, PC

(57) ABSTRACT

A speech recognition server has a speech recognition engine, and a mode control table to hold a speech recognition mode for each call. The speech recognition engine has a mode management unit to designate a speech recognition mode for a decoder, and an output analysis unit to analyze recognition result data speech-to-text converted by speech recognition. The output analysis unit designates the speech recognition mode for the mode management unit in accordance with result of analysis of the recognition result data speech-to-text converted by the speech recognition. The mode management unit designates the speech recognition mode for the decoder in accordance with the designation with the output analysis unit. Upon speech recognition of call data, it is possible to suppress hardware resource consumption while improve users' satisfaction.

18 Claims, 20 Drawing Sheets

(56) References Cited

U.S. PATENT DOCUMENTS

| | | | |
|---|---|---|---|
| 2005/0216269 A1* | 9/2005 | Scahill | G06F 17/30663 |
| | | | 704/270.1 |
| 2008/0082329 A1* | 4/2008 | Watson | G10L 15/32 |
| | | | 704/235 |
| 2015/0373196 A1* | 12/2015 | Scott | H04M 3/42221 |
| | | | 704/235 |
| 2017/0332134 A1* | 11/2017 | Iwami | G06F 3/0346 |

* cited by examiner

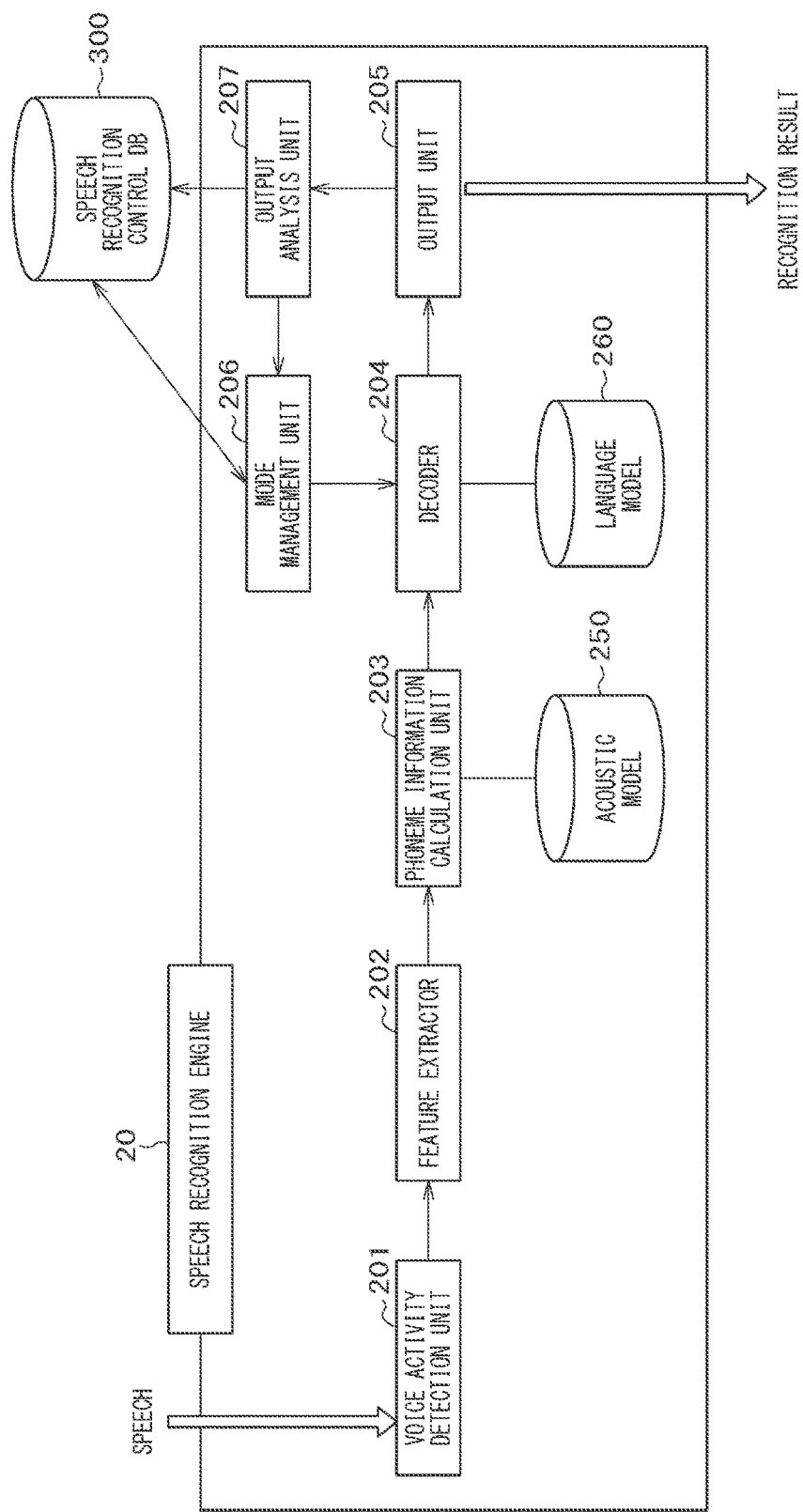

FIG. 6

CALL MANAGEMENT TABLE 100

| CALL ID | OPERATOR ID | CALLER NUMBER | INCOMING CALL NUMBER | START TIME | END TIME | RECORDING STATE | AUDIO FILE | RECOGNITION RESULT |
|---|---|---|---|---|---|---|---|---|
| AAAA | 1234 | 090xxxx | 1111 | 201606010900 | | TALKING | A.wav | A.txt |
| BBBB | 5678 | 090yyyy | 2222 | 201606010850 | 201606010855 | CALL END | B.wav | B.txt |

FIG. 7

MODE CONTROL TABLE 301

| CALL ID | OPERATOR ID | CURRENT MODE |
|---|---|---|
| AAAA | 1234 | NORMAL |
| CCCC | 9876 | HIGH-LEVEL RECOGNITION |

FIG. 8

DEFAULT MODE TABLE 302

| OPERATOR ID | CURRENT MODE |
|---|---|
| 1234 | NORMAL |
| 5678 | NORMAL |
| 9876 | HIGH-LEVEL RECOGNITION |

FIG.9

OUTPUT ANALYSIS MANAGEMENT TABLE 303

| CALL ID (303a) | OPERATOR ID (303b) | CUMULATIVE NUMBER OF TIMES OF OPERATOR NG WORD (303c) | CUMULATIVE NUMBER OF TIMES OF CUSTOMER NG WORD (303d) | CUMULATIVE NUMBER OF TIMES OF OVERLAP (303e) | CUMULATIVE NUMBER OF TIMES OF VOLUME SUDDEN CHANGE (303f) |
|---|---|---|---|---|---|
| AAAA | 1234 | 1 | 0 | 0 | 0 |
| CCCC | 9876 | 3 | 5 | 3 | 1 |

FIG.10

OPERATOR NG WORD LIST 304

| I AM VERY SORRY |
| NO, PLEASE |
| I CAN'T |

FIG.11

CUSTOMER NG WORD LIST 305

| I DON'T UNDERSTAND |
|---|
| DON'T BE SILLY |
| IT DOESN'T MAKE SENSE |

FIG.12

MODE CHANGE THRESHOLD TABLE 306

| 306a | 306b | 306c | 306d |
|---|---|---|---|
| THRESHOLD FOR NUMBER OF TIMES OF OPERATOR NG WORD | THRESHOLD FOR NUMBER OF TIMES OF CUSTOMER NG WORD | THRESHOLD FOR NUMBER OF TIMES OF OVERLAP | THRESHOLD FOR NUMBER OF TIMES OF VOLUME SUDDEN CHANGE |
| 3 | 3 | 5 | 3 |

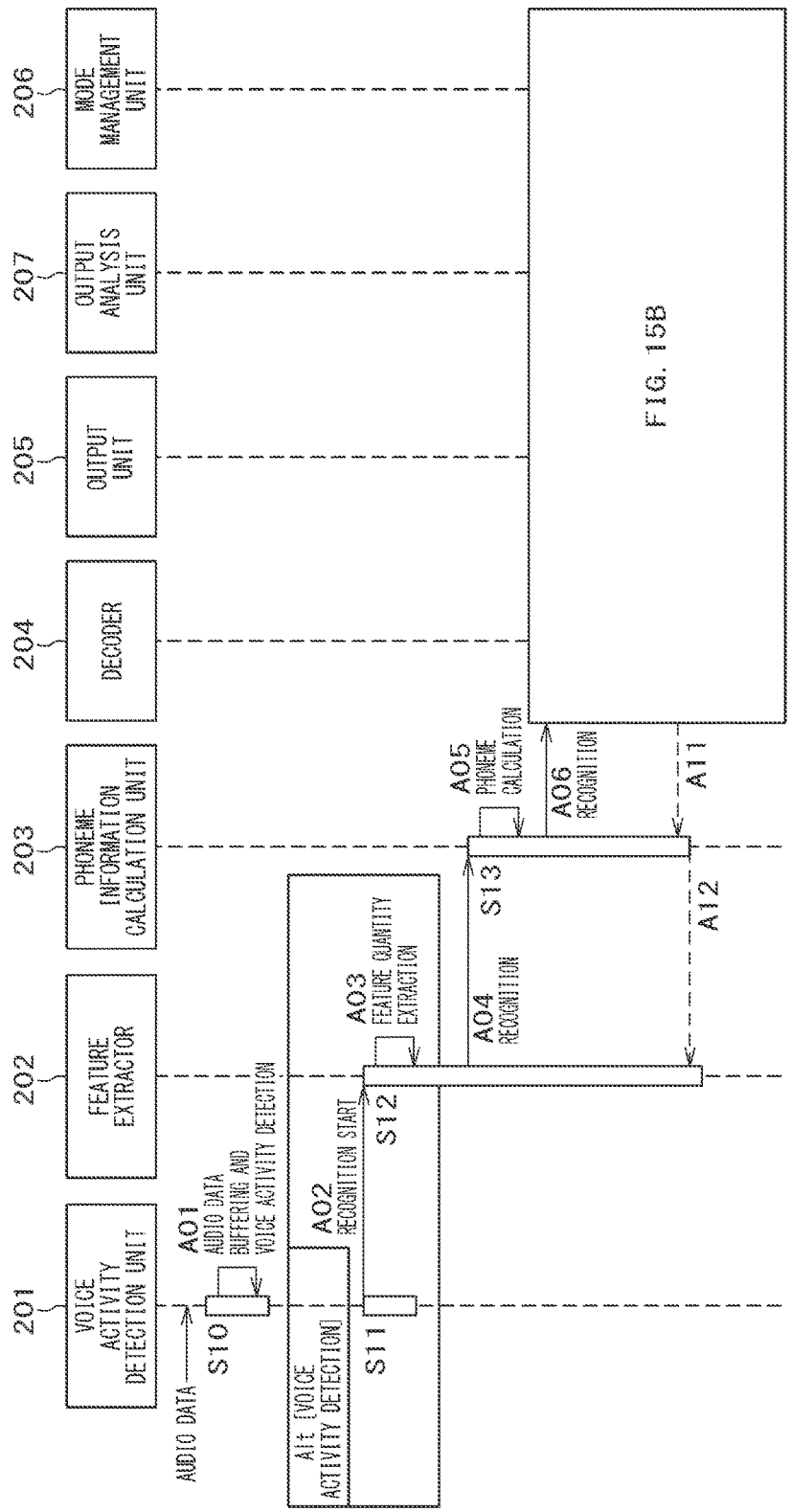

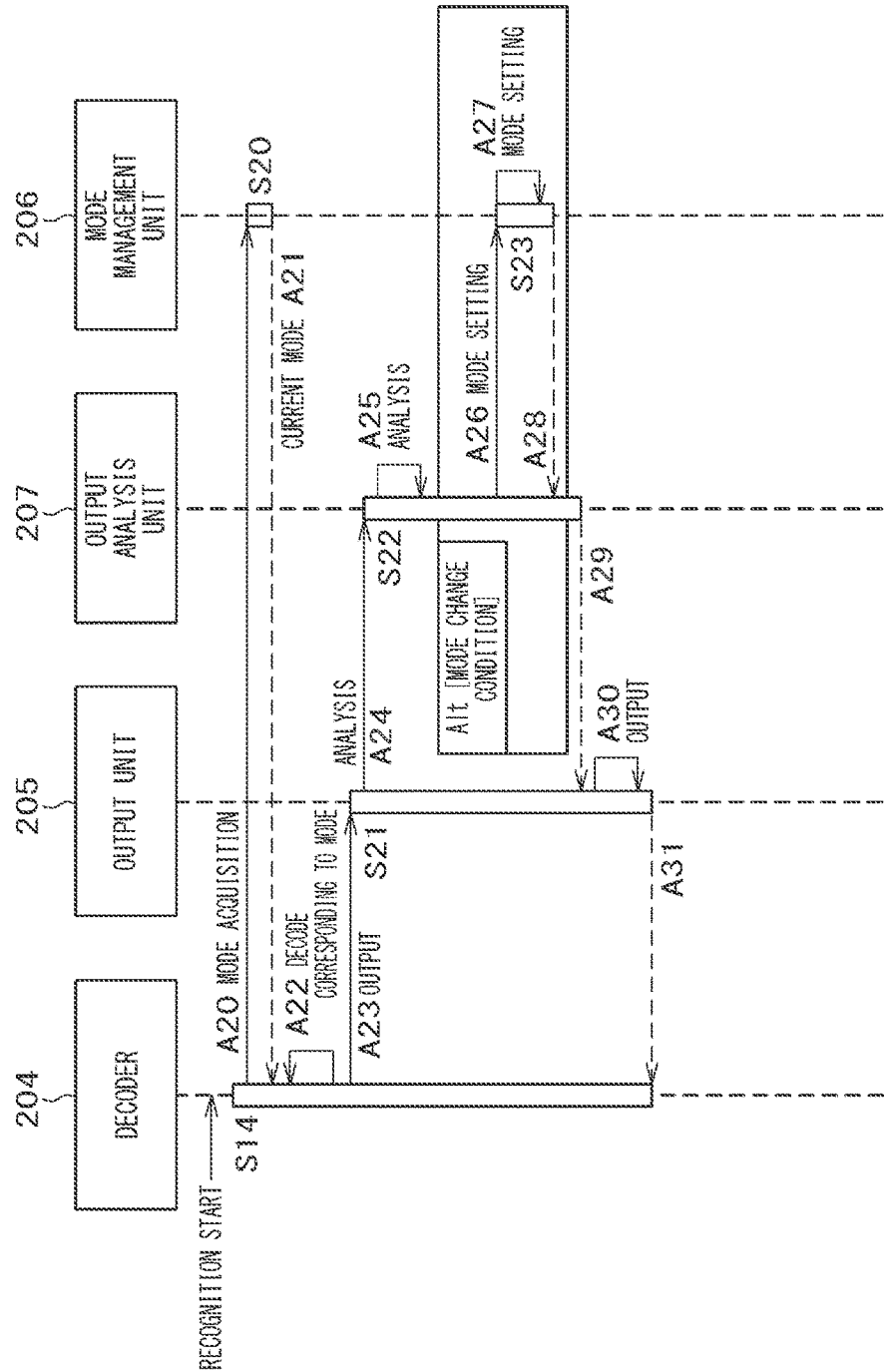

FIG. 16A

NORMAL MODE

| # | CANDIDATE |
|---|---|
| 1 | KYOWA, II (TODAY IS, GOOD...) |
| 2 | KYO WA I (TODAY, IS, GOOD...) |
| ... | ... |

FIG. 16B

HIGH-LEVEL RECOGNITION MODE

| # | CANDIDATE |
|---|---|
| 1 | 今日ハ11日 (TODAY IS A GOOD DAY) |
| 2 | 今日ハ日1 (TODAY, IS, A DAY...) |
| 3 | 京ハII 緋 (KYO, IS, GOOD, SCARLET...) |
| 4 | 講和 一応 (PEACE, FOR THE PRESENT) |
| ... | ... |

FIG. 22

MARKED TELEPHONE NUMBER TABLE 307

| TELEPHONE NUMBER | CUMULATIVE NUMBER OF TIMES OF HIGH-LEVEL RECOGNITION MODE SETTING |
|---|---|
| 090xxxxx | 15 |
| 080xxxxx | 20 |

CALL MANAGEMENT SYSTEM AND ITS SPEECH RECOGNITION CONTROL METHOD

BACKGROUND OF THE INVENTION

The present invention relates to a call management system and its speech recognition control method, and more particularly, to a call management system and its speech recognition control method preferably applicable to speech recognition of recorded content of a call between a customer and an operator in a call center, with suppressed hardware resource consumption, to improve the customer's satisfaction by providing customer services utilizing the result of speech recognition.

In a call center, real-time speech-to-text conversion from call contents and call monitoring are performed for the purpose of improvement in service quality. A speech recognition engine for speech recognition performs speech-to text conversion every time an audio file is generated or updated in a real-time manner. A supervisor of the center checks the text through a monitor. When a call seems to have a problem, the supervisor may change an operator in charge of the call to a more skilled operator, or supply helpful information to the current operator.

Regarding the speech recognition technique in the call center, e.g., a call data management system disclosed in Japanese Patent Application Laid-Open No. 2015-177411 is known. A speech recognition server of the call data management system in Japanese Patent Application Laid-Open No. 2015-177411 acquires call start timing from audio data, and starts speech recognition immediately after the call start timing.

According to Japanese Patent Application Laid-Open No. 2015-177411, the speech recognition server of the call data management system performs real-time speech recognition on a call by acquiring call start timing from audio data as described above.

However, optimization of speech recognition hardware resource is not taken into consideration. In general, the speech recognition engine as a speech recognition core module consumes the hardware resources (CPU (Central Processing Unit), a main memory and the like) by a large amount. To operate a large number of speech recognition engines, a large number of machines are required.

In contrast, there are various types of call contents, from a simple inquiry to be comparatively easily handled to a customer's complaint to be carefully handled. Accordingly, it is not necessary to monitor all the calls handled by the operators. It is desirable to invest the hardware resources, software resources and human resources in a call truly requiring monitoring.

The present invention has been made to solve the above-described problems, and has an object to provide a call management system and its speech recognition control method capable of, upon speech recognition of recorded call content, suppressing consumption of hardware resources while efficiently operating the call management system.

SUMMARY OF THE INVENTION

The call management system according to the present invention is a call management system for recording a call from an external line, performing speech-recognition, speech-to-text converting the call, and displaying text, comprising: a speech recognition server that performs speech recognition on recording data of call data, and outputs text data. The speech recognition server has: a speech recognition engine that performs speech recognition on audio data and speech-to-text converts the data; and a mode control table that holds a speech recognition mode for each call. The speech recognition engine has: a mode management unit that designates a speech recognition mode for a decoder; and an output analysis unit that analyzes recognition result data, speech-to-text converted by the speech recognition. The output analysis unit designates the speech recognition mode for the mode management unit, based on the result of analysis of the recognition result data speech-to-text converted by the speech recognition. The mode management unit rewrites the speech recognition mode held in the mode control table based on the designation with the output analysis unit, for each call, and designates the speech recognition mode for the decoder based on the speech recognition mode held in the mode control table, for each call.

BRIEF DESCRIPTION OF DRAWINGS

FIG. 5 is a block diagram showing a configuration of a speech recognition engine;

FIG. 6 is a table showing an example of a call management table 100;

FIG. 7 is a table showing an example of a mode control table 301;

FIG. 8 is a table showing an example of a default mode table 302;

FIG. 9 is a table showing an example of an output analysis management table 303;

FIG. 10 is a list showing an example of an operator NG word list 304;

FIG. 11 is a list showing an example of a customer NG word list 305;

FIG. 12 is a table showing an example of a mode change threshold table 306;

FIG. 15A is a sequence diagram (part 1) showing the speech recognition processing in a speech recognition engine according to the first embodiment;

FIG. 15B is a sequence diagram (part 2) showing the speech recognition processing in the speech recognition engine according to the first embodiment;

FIG. 16A and FIG. 16B are tables comparatively showing candidates in a decoder in a normal mode and a high-level recognition mode;

FIG. 22 is a table showing an example of a marked telephone number table.

DESCRIPTION OF THE PREFERRED EMBODIMENT

Hereinbelow, respective embodiments according to the present invention will be described using FIGS. 1 to 22.

First Embodiment

Hereinbelow, a first embodiment according to the present invention will be described using FIGS. 1 to 19.

First, the configuration of a call management system in a call center, according to the first embodiment of the present invention, will be described using FIGS. 1 to 5.

Figure 1:
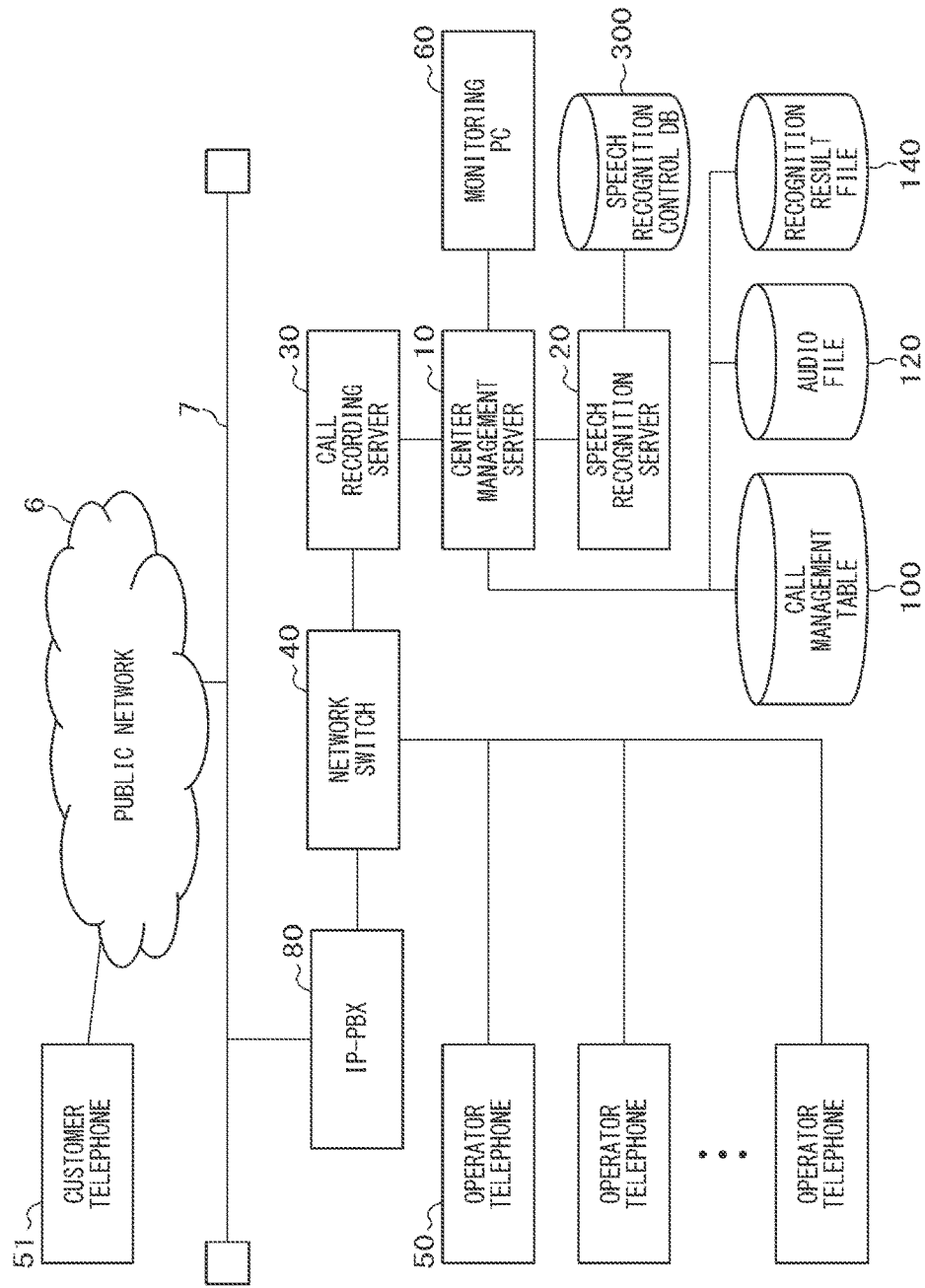
FIG. 1 is a block diagram showing an entire configuration of a call management system in a call center.

FIG. 1 is a block diagram showing an entire configuration of a call management system in the call center.

Figure 2:
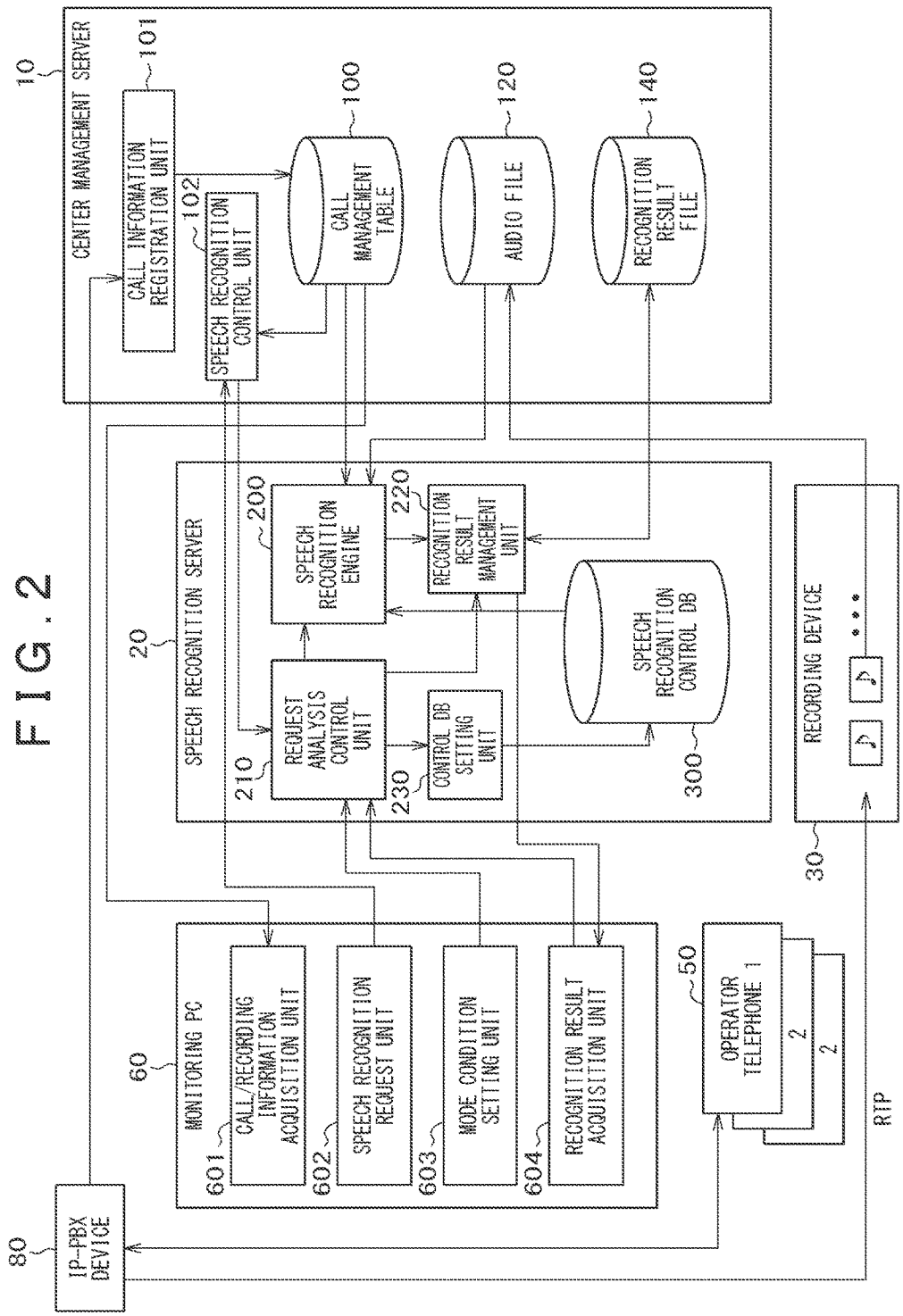
FIG. 2 is a functional block diagram of the call management system according to a first embodiment of the present invention.

FIG. 2 is a functional block diagram of the call management system according to a first embodiment.

Figure 3:
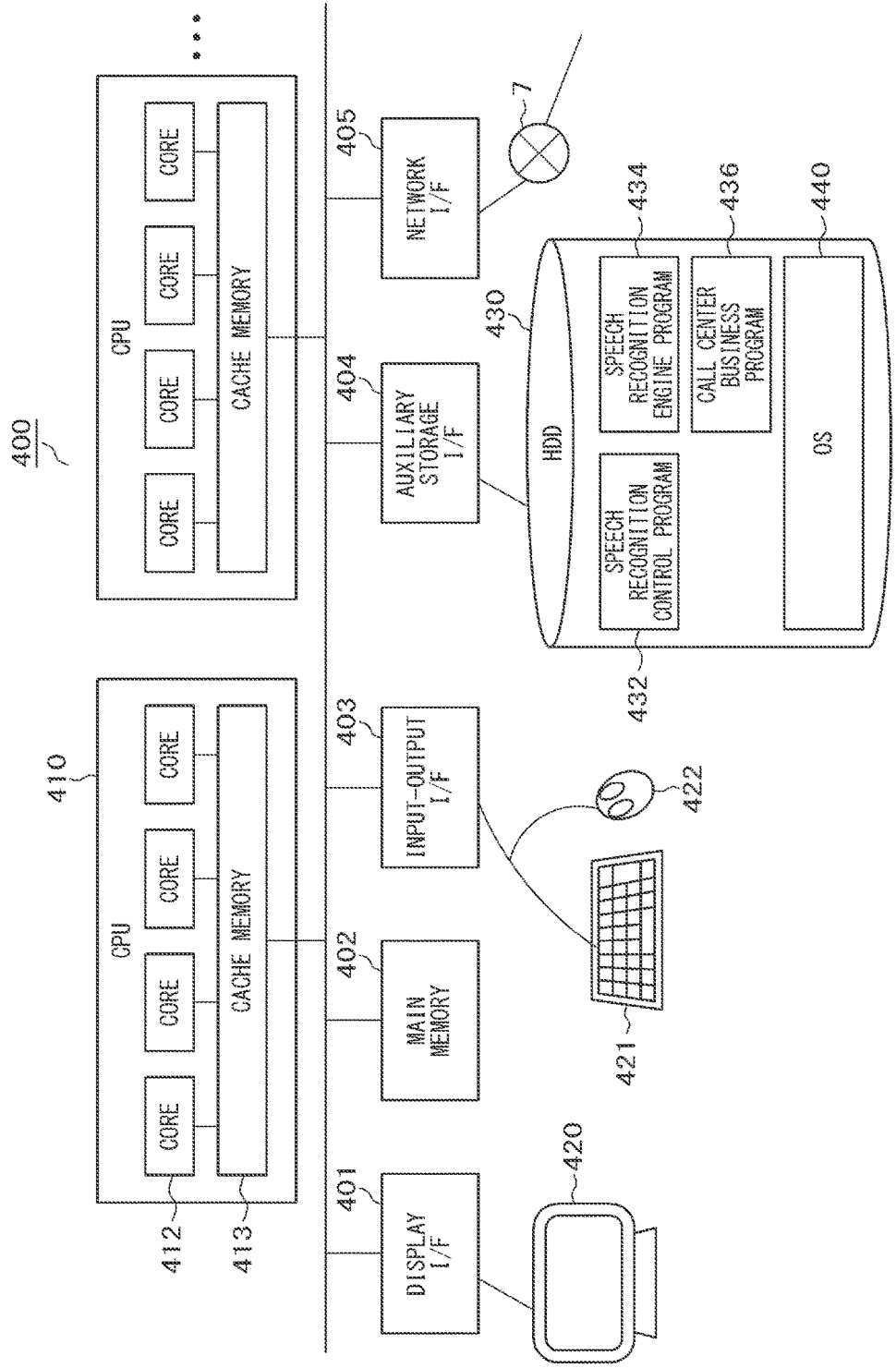
FIG. 3 is a block diagram showing a hardware and software configurations of a server installed in the call center.

FIG. 3 is a block diagram showing a hardware and software configurations of a server installed in the call center.

Figure 4B:
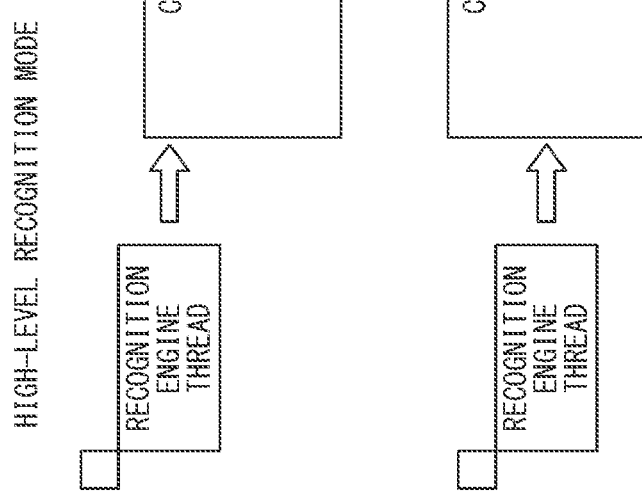
FIG. 4A and FIG. 4B are schematic diagrams explaining parallel processing in the server installed in the center.
Figure 4A:
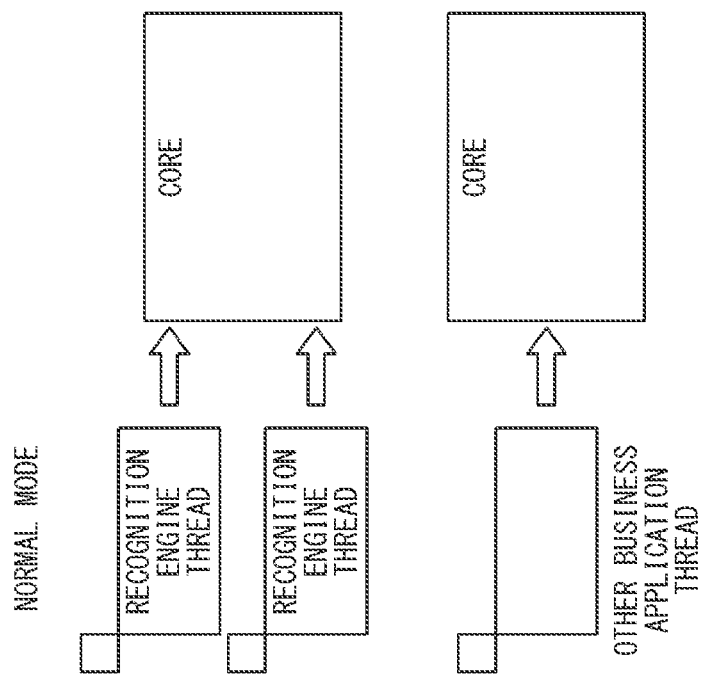

FIG. 4A and FIG. 4B are schematic diagrams explaining parallel processing in the server installed in the center.

FIG. 5 is a block diagram showing a configuration of a speech recognition engine.

As shown in FIG. 1, the call management system in the call center according to the present embodiment has a configuration where an IP-PBX (Internet Protocol-Private Branch eXchange, Private Branch Exchange for IP line) 80, connected from a customer telephone 51 of a customer or the like via a public network 6, is connected via a network 7 to an operator telephone 50, to make a telephone call. The operator receives the call originated from the customer telephone 51, and through exchange processing with the IP-PBX 80, communicates with the customer as a communicator using the customer telephone 51, responds to an inquiry from the customer or supplies services.

A call center system is configured by connecting the IP-PBX 80, a network switch 40, a call recording server 30, a center management server 10, a speech recognition server 20, the operator telephone 50, and a monitoring PC 60 via the network 7.

The IP-PBX 80 receives a call from the customer telephone 51 of a customer, and performs protocol conversion for the IP network and the public network 6, call control for incoming and originating calls, and the like.

The network switch 40 is a device which learns packet transfer route on the network and performs packet transfer processing. Note that in FIG. 1, only the IP-PBX 80, the operator telephone 50, and the call recording server 30 are connected to the network switch 40. It may be configured such that the center management server 10, the speech recognition server 20, and the monitoring PC 60 are connected to the network switch 40.

The call recording server 30 is used for recording a data stream of a call between the customer telephone 51 and the operator telephone 50 as recording data via the IP-PBX 80.

The center management server 10 is used for management of call information, recording information, and speech recognition information, linked to each other, and for instruction to the speech recognition server 20 regarding speech recognition. The center management server 10 is used as a database for storage and management of a call management table 100, an audio file 120, and a recognition result file 140.

The speech recognition server 20 is used for conversion of recording data as audio data to text data. The speech recognition server 20 is used as a database for access to a speech recognition control DB 300.

The operator telephone 50 is used for each operator for operator call business, i.e., to make an external call with the customer telephone 51 of a customer, via the public network 6.

The monitoring PC 60 is used by a supervisor of the call center to display information on call center operating state, information on a call, further to control devices of the call center or input instruction to the operator. In particular, in the present embodiment, text as a result of speech recognition of a call between the customer and the operator is displayed on the monitoring PC 60.

Next, the relationship between functions of the respective parts of the call management system and data in the call center will be described using FIG. 2.

The monitoring PC 60 has respective functional blocks, a call/recording information acquisition unit 601, a speech recognition request unit 602, a mode condition setting unit 603, and a recognition result acquisition unit 604.

The call/recording information acquisition unit 601 is a part for the supervisor to acquire call information and/or recording information in the center from the call management table 100 held in the center management server 10.

The speech recognition request unit 602 requests the center management server 10 to perform speech recognition on the recording data.

The mode condition setting unit 603 is a part to set information on a speech recognition mode in the speech recognition server 20. The speech recognition mode will be described in detail later.

The speech recognition result acquisition unit 604 is a part to receive the result of speech recognition of the recording data, requested to the speech recognition server 20, as text.

The call with the operator telephone 50 is made by the IP-network RTP (Real-time Transport Protocol). It is sent to the call recording server 30 then transferred to the center management server 10, and stored, as an audio file 120 divided by a predetermined period of time.

Further, the IP-PBX 80 transmits the call information to the center management server 10.

The speech recognition server 20 has a request analysis control unit 210, a speech recognition engine 200, a recognition result management unit 220, and a control DB setting unit 230. The speech recognition server 20 has the speech recognition control DB 300 as a database for speech recognition control.

The request analysis control unit 210 receives a speech recognition request from the center management server 10, a mode condition setting request from the monitoring PC 60, and a recognition result acquisition request, and issues instructions to the speech recognition engine 200, the recognition result management unit 220, and the control DB setting unit 230. The speech recognition engine 200 is a part to convert the recording data, based on set acoustic model and language model, into text data corresponding to the speech. The recognition result management unit 220 is a part to store text data outputted from the speech recognition engine 200 as a recognition result file 140, and to manage access to the data. Further, the recognition result management unit has a function of transmitting data on the recognition result file 140 in response to a request from the recognition result acquisition unit 604 of the monitoring PC 60.

The speech recognition control DB 300 holds tables for control of speech recognition processing in the speech recognition engine 200. The details of the tables stored on the speech recognition control DB 300 will be described later.

The center management server 10 has functional blocks, i.e., a call information registration unit 101, and a speech recognition control unit 102, and holds the call management table 100, an audio file 120, and a recognition result file 140.

The call information registration unit 101 registers the call information transferred from the IP-PBX, with linkage to the audio information transferred from the call recording server 30, the recognition result information from a speech recognition engine in the speech recognition server 20, in the call management table 100.

The speech recognition control unit 102 receives a request from the monitoring PC 60, and instructs the speech recognition server 20 to perform speech recognition on the call.

The call management table 100 holds information on a call and its audio information, and result of recognition of the audio information. The details of the call management table 100 will be described later.

The speech recognition engine 200 reads information in the call management table 100 and the audio file 120, recognizes audio information of a designated call, converts the information into text, and writes the text in the recognition result file 140.

Next, hardware and software configurations of the server installed in the call center will be described using FIG. 3.

A server 400 installed in the call center in the present embodiment is a processor having a multiprocessor-multicore parallel architecture. The server 400 includes a function in the speech recognition server 20, and functions of servers for execution of other business programs (a file server, a database server, a Web server and the like). Further, the server 400 shown in FIG. 3 may be a server to present the functions of the center management server 10 and the call recording server 30 described in FIGS. 1 and 2.

As shown in FIG. 3, as the hardware configuration of the server 400 installed in the call center, CPUs 410, a main memory 402, a display I/F 401, an input-output I/F 403, a network I/F 405, and an auxiliary storage I/F 404 are connected to each other via a bus.

The CPU 410 controls the respective parts of the server 400, and loads a program necessary for the main memory 402 and executes the program. In particular, the server 400 according to the present embodiment has a symmetric multiprocessing (SMP) architecture including plural CPUs 410 and it has a main memory 402. Further, the CPU 410 has plural cores 412, and cache memory 413 to access from the cores 412 in the CPU 410. In the CPU 410, processing is allocated and executed in control unit of "thread" as a processing schedule unit from the OS (Operating System).

The main memory 402 generally has a volatile memory such as a RAM. The main memory 402 holds a program executed with the CPU 410 and data referred to with the CPU 410. The network I/F 405 is an interface for connection to the network 7. The display I/F 401 is an interface for connection to a display device 420 such as an LCD (Liquid Crystal Display).

An input-output I/F 403 is an interface for connection to an input-output device. In the example of FIG. 3, a keyboard 421 and a mouse 422 as a pointing device are connected.

An auxiliary storage I/F 404 is an interface for connection to an auxiliary storage device such as an HDD (Hard Disk Drive) 430 or an SSD (Solid State Drive). Especially in the server, in some cases, the HDDs may be arranged in an array as a disk array.

The HDD 430 has a large storage capacity and holds a program for execution of the present embodiment. The server 400 holds an OS 440, a speech recognition server control program 432, a speech recognition engine program 434, and a call center business program 436.

The OS 440 manages the hardware resources and software resources of the server 400, and executes application programs. Especially in the present embodiment, the OS is capable of parallel processing to schedule processing in unit of process or thread.

The speech recognition server control program 432 and the speech recognition engine program 434 are executed as the functions in the speech recognition server 20 shown in FIG. 2. The speech recognition server control program 432, executed with the CPU 410, realizes the functions of the request analysis control unit 210, the recognition result management unit 220, and the control DB setting unit 230. The speech recognition engine program 434 realizes the function of the speech recognition engine 200.

Next, the relationship between the parallel processing and consumption of the hardware resources in the server 400 will be described using FIG. 3.

The speech recognition server according to the present embodiment has two types of modes, i.e., a normal mode and a high-level recognition mode, selected in accordance with speech recognition manner. The details of speech recognition in these modes will be described later.

The normal mode is an operation mode where the processing load on the speech recognition engine 200 in the speech recognition server 20 is relatively light. The high-level recognition mode is an operation mode where the processing load is heavier and the hardware resources are consumed in comparison with the normal mode, however, speech recognition is performed with high accuracy.

As shown in FIG. 4A, in the normal mode, it is possible to schedule one core 412 of one CPU 410 to simultaneously process two threads processed with the speech recognition engine 200 (hereinbelow, "recognition engine thread"), and schedule the other cores to process threads by other business application programs.

In contrast, as shown in FIG. 4B, in the high-level recognition mode, only one recognition engine thread is processed with one core 412 of the CPU 410. As two cores are occupied, the threads of other business application programs are not scheduled.

Accordingly, in the point of saving of the hardware resource, it is preferable to perform speech recognition in the normal mode. Further, it is desirable to change the recognition mode from the normal mode to the high-level recognition mode in accordance with necessity.

Next, the configuration of the speech recognition engine will be described using FIG. 5.

The speech recognition engine 200 is a module to perform recognition on audio data based on linguistic features and perform speech-to-text conversion. As a current general speech recognition technique, voice activity is detected from audio data and a feature is extracted by speech spectrum calculation or the like. Then phoneme information calculation and decode are performed from the feature, thus recognition as a speech is made. As shown in FIG. 5, the speech recognition engine 200 according to the present embodiment has a voice activity detection unit 201, a feature extractor 202, a phoneme information calculation unit 203, a decoder 204, an output unit 205, a mode management unit 206, and an output analysis unit 207. Note that the mode management unit 206 and the output analysis unit 207 are characteristic elements of the present embodiment added to a general speech engine.

The voice activity detection unit 201 is a part to detect speech activity from audio data. The voice activity detection unit 201 determines a moment where the volume is reduced after noise elimination or the like, as a division of audio data, then asynchronously starts feature extraction.

The feature extractor 202 is a part to extract a feature from the audio data. Note that the feature represents the quantity of a wavelength included in the audio data, e.g., the speech spectrum, the volume, and its difference.

The phoneme information calculation unit 203 is a part to determine a phoneme (a phonetic symbol such as "a", "k", or "i") corresponding to the voice during the voice activity section by calculation from the feature using an acoustic model 250. The acoustic model 250 is a model of recorded feature quantities close to respective phonemes.

The decoder 204 is a part to determine what is talked using the phonemes and a language model 260. The language model 260 is a model formulized regarding the relationship among the speech parts and the syntactic structure of a sentence, among the words, among the documents, and the like, in speech recognition language processing. In the decoder 204, the presentation manner of decode candidates is changed between the normal mode and the high-level recognition mode. The details of the presentation of decode candidates will be described later.

The output unit 205 is a part to speech-to-text convert the result of speech recognition and output the text.

The mode management unit 206 is a part to instruct the decoder 204 to select the normal mode or the high-level recognition mode based on information stored on the speech recognition control DB 300.

The output analysis unit 207 is a part to analyze the result of speech recognition outputted from the output unit 205, reflect the result in the speech recognition control DB 300, and instruct the mode management unit 206 to select the normal mode or the high-level recognition mode.

Next, the data structure used in the call management system according to the first embodiment will be described using FIGS. 6 to 12.

FIG. 6 is a table showing an example of the call management table 100.

FIG. 7 is a table showing an example of a mode control table 301.

FIG. 8 is a table showing an example of a default mode table 302.

FIG. 9 is a table showing an example of an output analysis management table 303.

FIG. 10 is a list showing an example of an operator NG word list 304.

FIG. 11 is a list showing an example of a customer NG word list 305.

FIG. 12 is a table showing an example of a mode change threshold table 306.

The call management table 100 is a table for linkage of call information, recording information, and recognition result text in the center management server 10. As shown in FIG. 6, the call management table 100 has respective fields of call ID 100a, operator ID 100b, caller number 100c, incoming call number 100d, start time 100e, end time 100f, recording state 100g, audio file 100h, and recognition result 100i.

The call ID 100a field is used for storage of the identifier of a call between a customer and an operator. The operator ID 100b field is used for storage of the identifier of the operator who communicated with the customer. The caller number 100c field and the incoming call number 100d field are respectively used for storage of a caller number and an incoming call number of the call. The start time 100e field and the end time 100f field are respectively used for storage of start time and end time. The recording state 100g field is used for storage of current speech recording state. The audio file 100h field is used for storage of a path of the recorded audio file in the center management server 10. The audio file is stored as e.g. a wav format file. The recognition result 100i field is used for storage of a path of a speech-recognized text file in the center management server 10. The speech-recognized text file is stored as e.g. a txt format file.

The following tables, the mode control table 301, the default mode table 302, the output analysis management table 303, the operator NG word list 304, the customer NG word list 305, and the mode change threshold table 306 are stored in the speech recognition control DB 300.

The NG words according to the present embodiment include operator NG words and customer NG words. A word requires monitoring when it appears in an operator's speech, and it is the operator NG word. Further, another word requires monitoring when it appears in a customer's speech, and it is the customer NG word. The particular examples of the operator NG word and the customer NG word will be described later.

The mode control table 301 is used for control of the speech recognition mode in the speech recognition engine. As shown in FIG. 7, the mode control table 301 has fields of call ID 301a, operator ID 301b, and current mode 301c.

The call ID 301a field is used for storage of the identifier of a call to be subjected to speech recognition. The operator ID 301b field is used for storage of the identifier of an operator involved in the call to be subjected to speech recognition. The current mode 301c field is used for storage of a current speech recognition mode in the speech recognition engine.

The default mode table 302 is used for storage of a default speech recognition mode in the speech recognition engine for the operator. As shown in FIG. 8, the default mode table 302 has fields of operator ID 302a and default mode 302b.

The operator ID 302a field is used for storage of the identifier of the operator for whom the default mode is set. The default mode 302b field is used for storage of a default speech recognition mode in the speech recognition engine for the operator ID 302a.

The output analysis management table 303 is used for storage of the result of analysis of speech-recognized text with the output analysis unit 207 of the speech recognition engine 200. As shown in FIG. 9, the output analysis management table 303 has respective fields of call ID 303a, operator ID 303b, cumulative number of times of operator NG word 303c, cumulative number of times of customer NG word 303d, cumulative number of times of overlap 303e, and cumulative number of times of volume sudden change 303f.

The call ID 303a field is used for storage of the identifier of a call between a customer and an operator. The operator ID 303b is used for storage of the identifier of the operator who communicated with the customer. The cumulative number of times of operator NG word 303c is used for storage of the cumulative number of times of appearance of the operator NG word, registered in the operator NG word list 304 to be described later, in the call. The cumulative number of times of customer NG word 303d field is used for storage of the cumulative number of times of appearance of the customer NG word, registered in the customer NG word list 305 to be described later, in the call. The cumulative number of times of overlap 303e field is used for storage of the cumulative number of times of determination that the speech overlap between the operator and the customer is longer than a predetermined period in the call. The cumulative number of times of volume sudden change 303f is used for storage of the cumulative number of times of determination that the volume of the operator's speech and that of the customer during the conversation is higher than predetermined volume in the call.

The cumulative number of times of operator NG word 303c, the cumulative number of times of customer NG word 303d, the cumulative number of times of overlap 303e, and the cumulative number of times of volume sudden change 303f mean that the greater the value is, the higher the monitor-requiring level is.

The operator NG word list 304 is a list of monitor-requiring words when included in an operator's speech (operator NG words). For example, as shown in FIG. 10, "I am very sorry", "No, please", "I can't" and the like are stored.

The customer NG word list 305 is a list of monitor-requiring words when included in a customer's speech (customer NG words). For example, as shown in FIG. 11, "I don't understand", "Don't be silly", "It doesn't make sense" and the like are stored.

When the value of the output analysis management table in FIG. 9 exceeds the value of the mode change threshold table 306, the mode management unit 206 of the speech recognition engine 200 instructs the decoder 204 to change the speech recognition mode from the normal mode to the high-level recognition mode. As shown in FIG. 12, the mode change threshold table 306 has fields of threshold for number of times of operator NG word 306a, threshold for number of times of customer NG word 306b, threshold for number of times of overlap 306e, and threshold for number of times of volume sudden change 306f.

The threshold for number of times of operator NG word 306a, the threshold for number of times of customer NG word 306b, the threshold for number of times of overlap 306e, and the threshold for number of times of volume sudden change 306f respectively mean that when the cumulative number of times of customer NG word 303d, the cumulative number of times of overlap 303e, and the cumulative number of times of volume sudden change 303f exceed the threshold value, the speech recognition mode in the speech recognition engine 200 is changed from the normal mode to the high-level recognition mode.

Next, processing with the call management system in the call center according to the first embodiment will be described using FIGS. 13 to 19.

First, general processing with the call management system in the call center will be described using FIG. 13.

Figure 13:
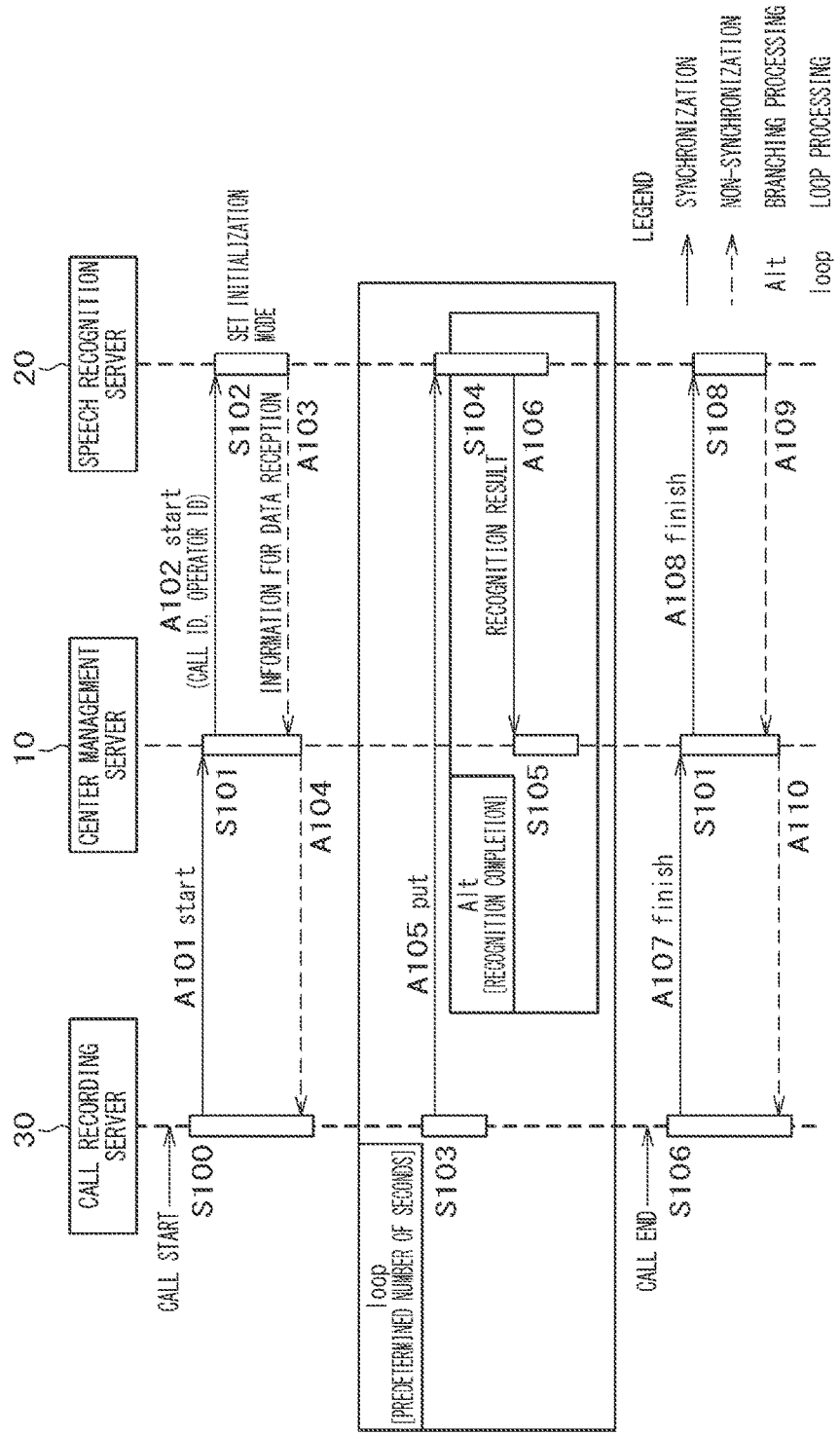
FIG. 13 is a sequence diagram showing processing with the call management system in the call center according to the first embodiment.

FIG. 13 is a sequence diagram showing processing with the call management system in the call center according to the first embodiment.

First, the call recording server 30 detects call start (S100). Next, the call recording server 30 notifies the center management server 10 of the call start (A101). The center management server 10 imparts a call ID to the call, and registers it in the call management table 100 (S101). Next, the center management server 10 sends the call ID and an operator ID to the speech recognition server 20 to notify the speech recognition server 20 of call start (A102). The mode management unit 206 of the speech recognition engine 200 in the speech recognition server 20 sets a current speech recognition mode in the mode control table 301 based on the call ID and the operator ID (S102). Further, the speech recognition server 20 transmits information for data reception (a port number, a device ID and the like) (S102, A103, A104). In the default setting, the default mode table 302 show in FIG. 8 is referred to, and a speech recognition mode is set. Next, the call recording server 30 transmits recording data to the speech recognition server 20, by a predetermined number of seconds, based on the information from the speech recognition server 20 (S103, A105). Next, every time a recognition result is outputted, the speech recognition server 20 sends the recognition result to the center management server 10 (S104, A106). Next, the call recording server 30 detects call end (S106). Next, the call recording server 30 notifies the center management server 10 of the call end (A107). Finally, the center management server 10 notifies the speech recognition server 20 of the call end (S107, A108).

Next, the details of the speech recognition processing in the speech recognition engine and the recognition mode change will be described using FIGS. 14 to 19.

Figure 14:
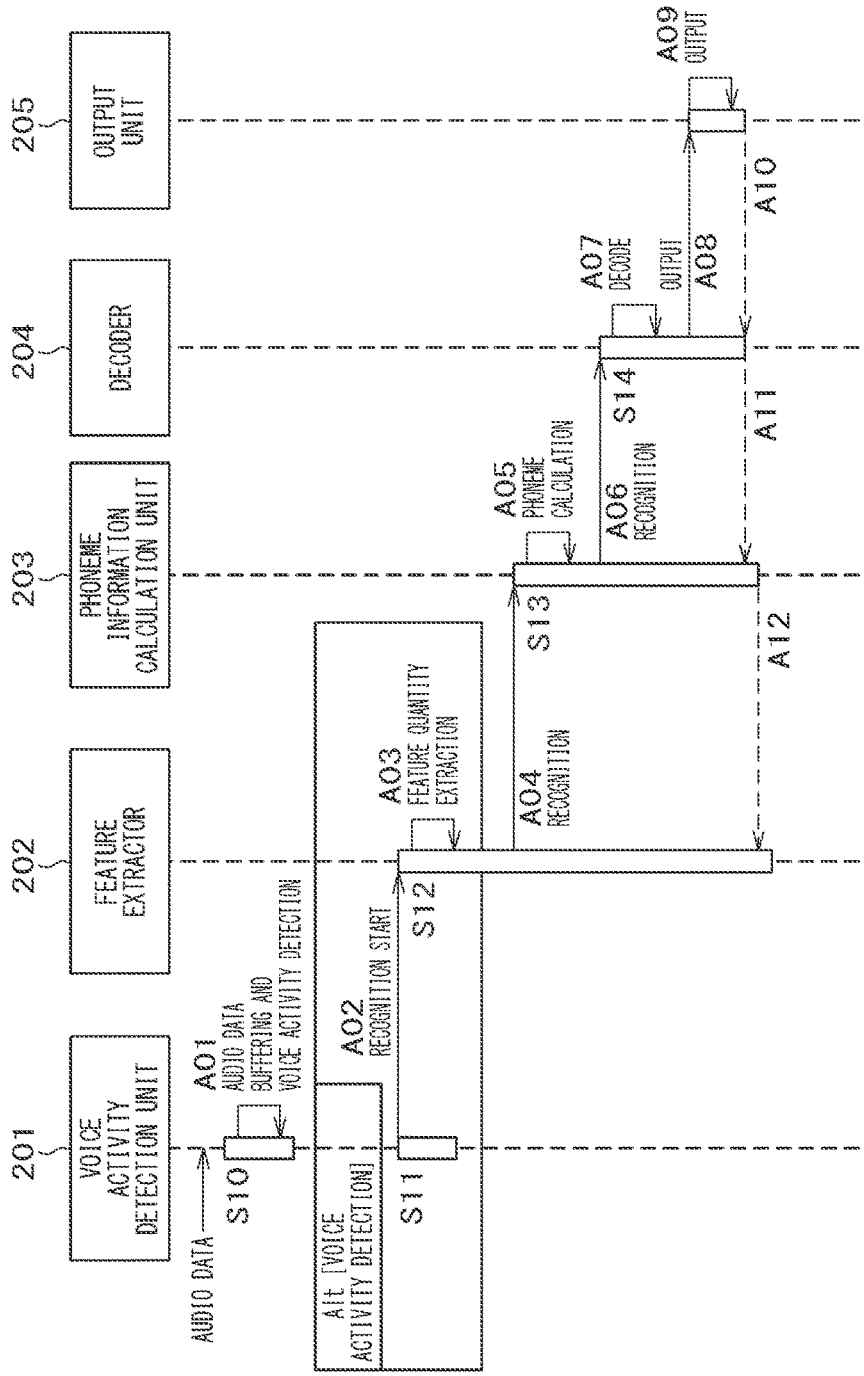
FIG. 14 is a sequence diagram showing speech recognition processing in a general speech recognition engine.

FIG. 14 is a sequence diagram showing the speech recognition processing in a general speech recognition engine.

FIGS. 15A and 15B are sequence diagrams showing the speech recognition processing in the speech recognition engine according to the first embodiment.

FIG. 16A and FIG. 16B are tables comparatively showing candidates in a decoder in a normal mode and a high-level recognition mode.

Figure 17:
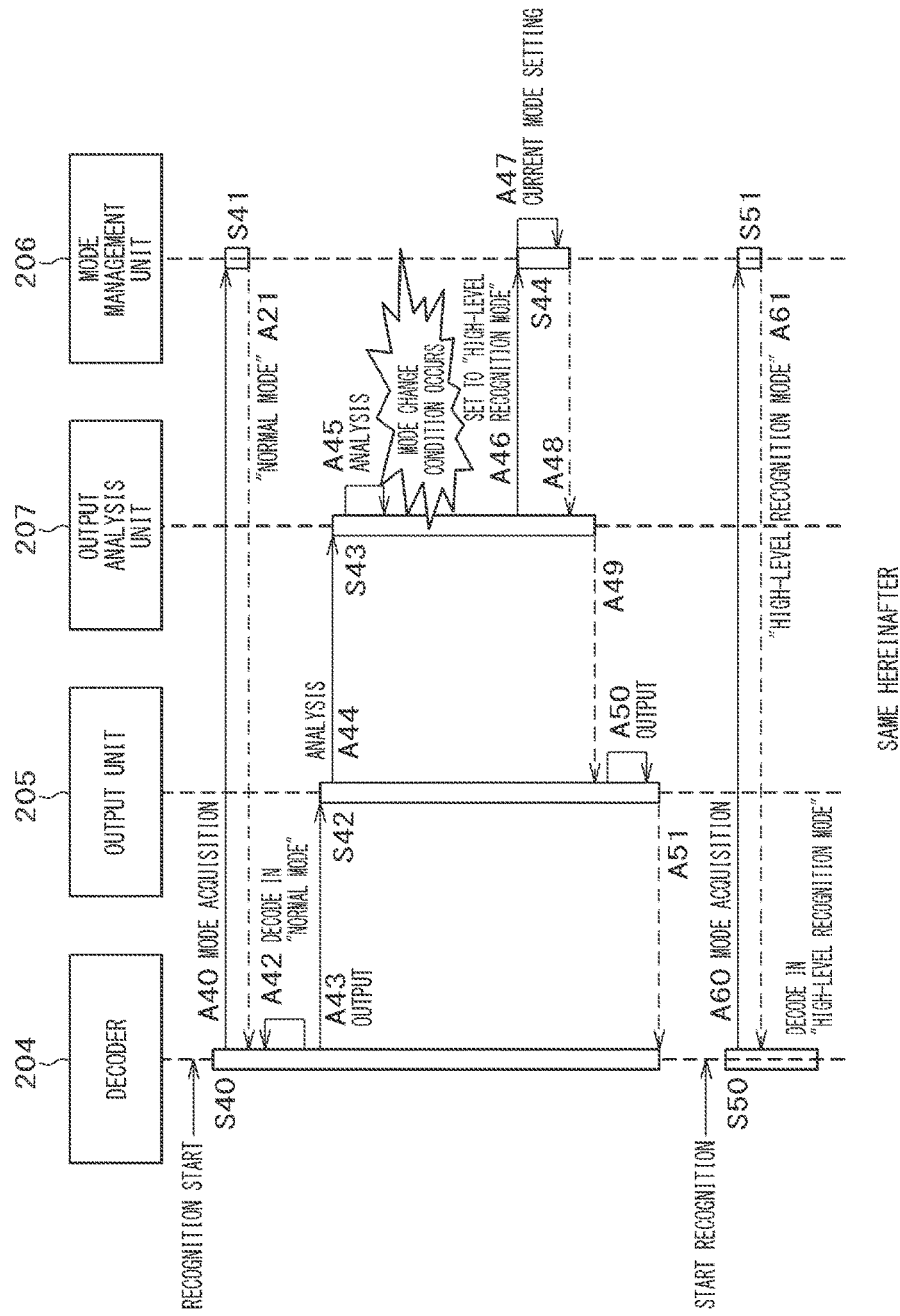
FIG. 17 is a sequence diagram showing processing to change a speech recognition mode in the speech recognition engine.

FIG. 17 is a sequence diagram showing processing to change the speech recognition mode in the speech recognition engine.

Figure 18A:
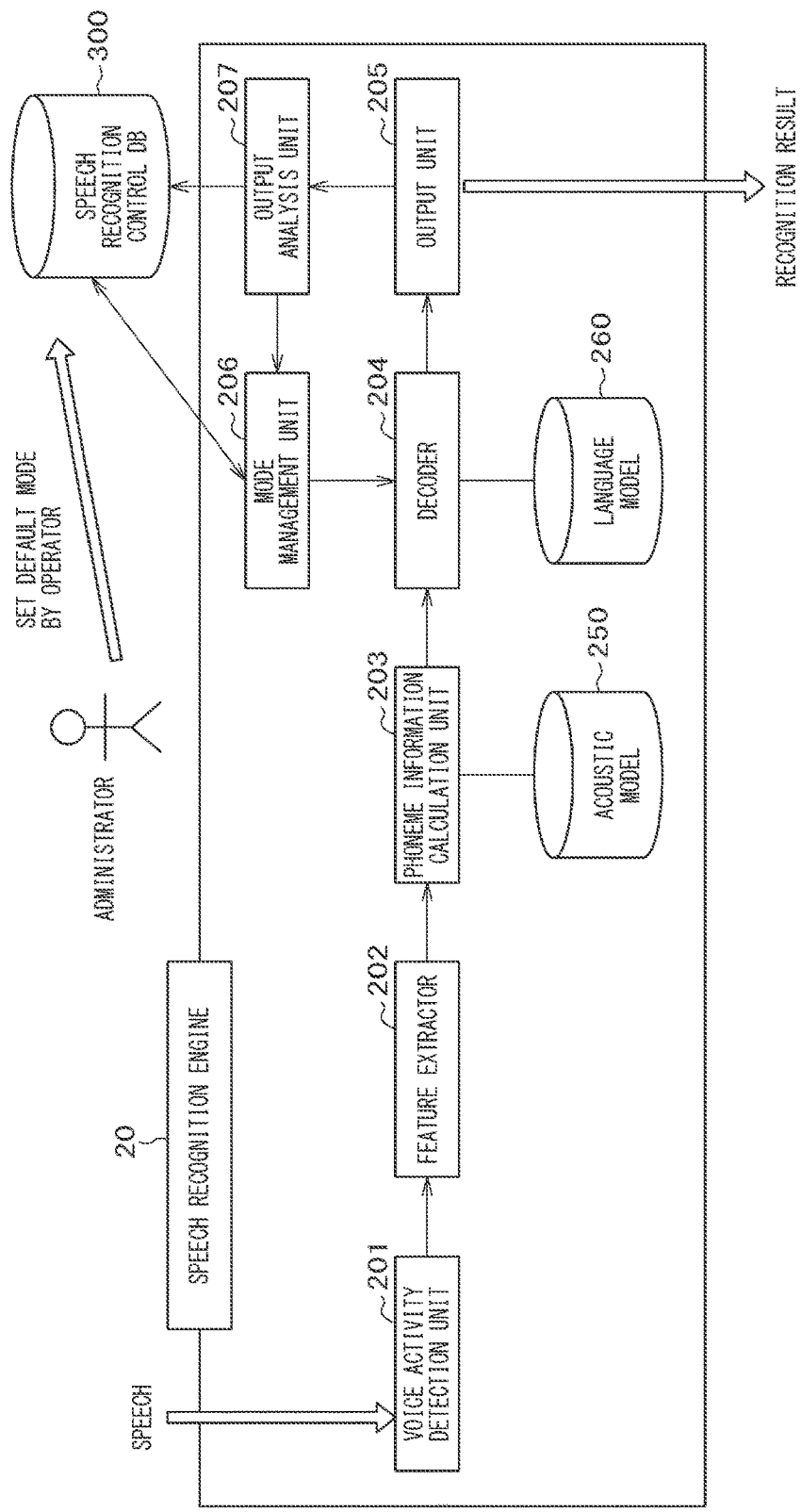
FIG. 18A is a block diagram explaining default mode setting.

FIG. 18A is a block diagram explaining the default mode setting.

Figure 18B:
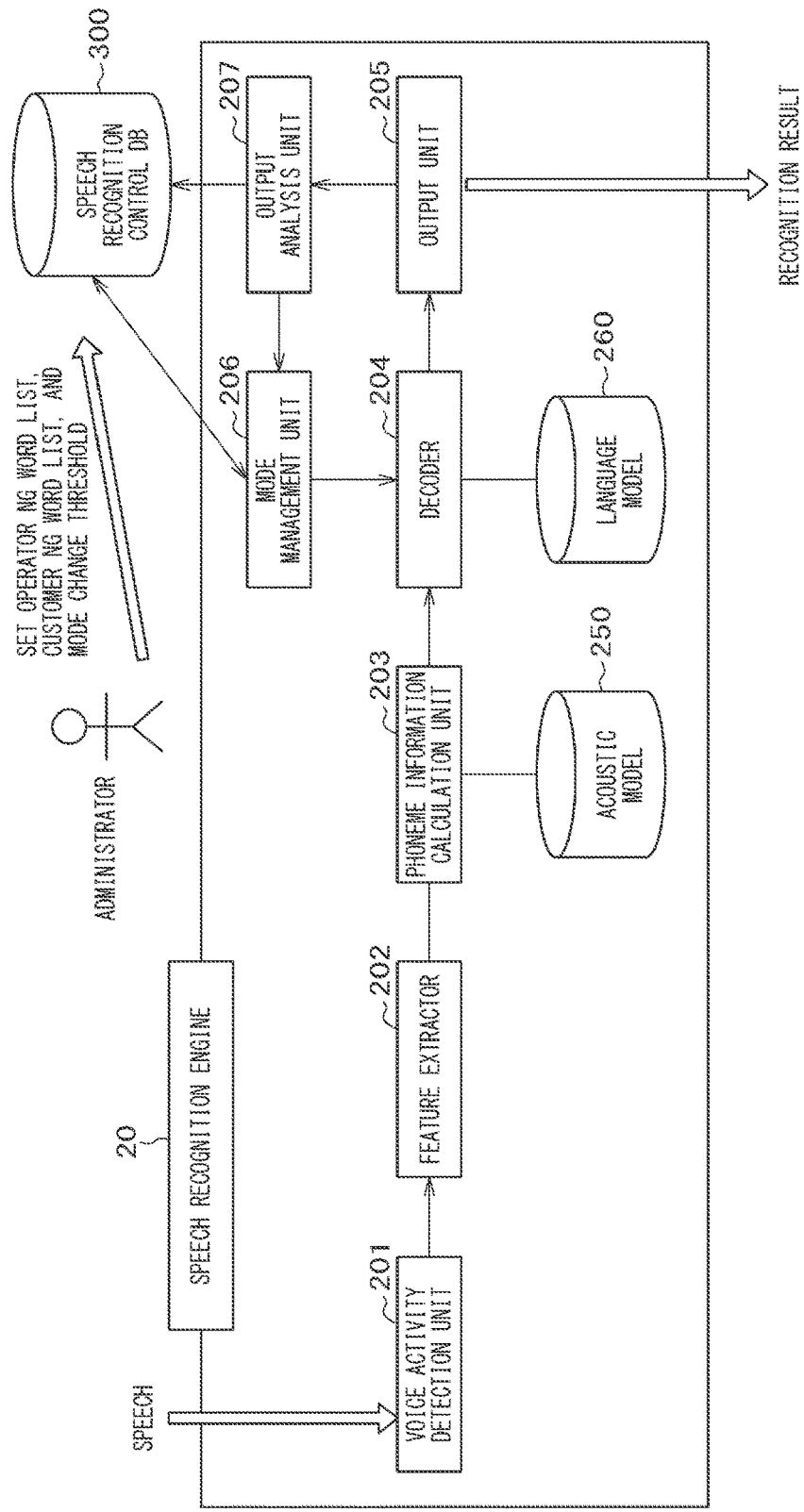
FIG. 18B is a block diagram explaining mode setting according to the first embodiment.

FIG. 18B is a block diagram explaining the mode setting according to the first embodiment.

Figure 19:
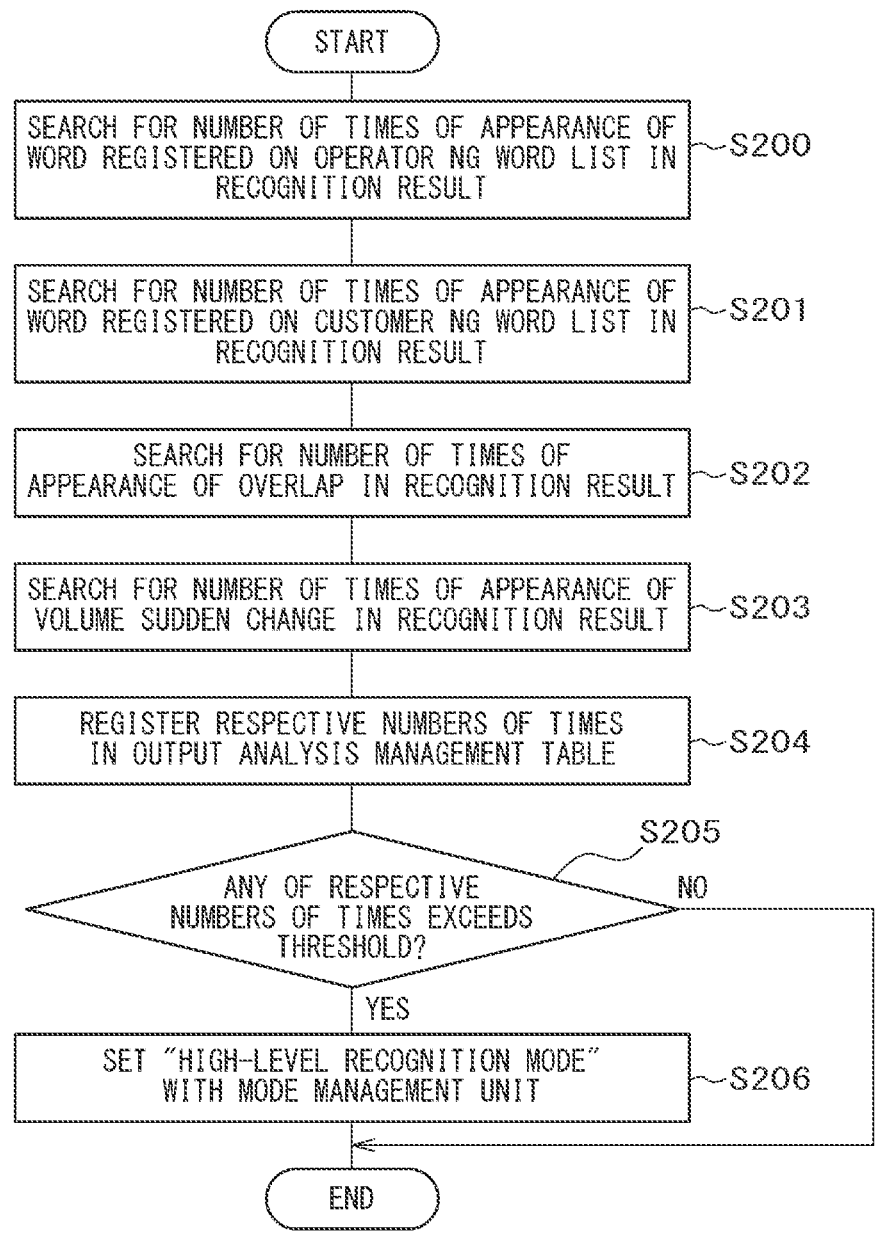
FIG. 19 is a flowchart showing recognition mode determination processing by analysis of recognition result from an output analysis unit of the speech recognition engine.

FIG. 19 is a flowchart showing recognition mode determination processing by analysis of recognition result from the output analysis unit of the speech recognition engine.

First, the speech recognition processing in a general speech recognition engine will be described using FIG. 14.

As described above, the speech recognition processing is detecting audio activity from audio data, extracting a feature by speech spectrum calculation and the like, and performing phoneme information calculation and decode from the feature.

First, the voice activity detection unit 201 performs buffering on the audio data and detects audio activity (S10 and A01). In this processing, after noise elimination or the like, the voice activity detection unit 201 determines a moment where the volume is reduced as a pause (temporary inactivity), then asynchronously starts feature extraction (S11) and the subsequent processing. The feature extractor 202 receives an instruction to start recognition (A02), and detects a feature from the audio data (S12, A03). Next, the phoneme information calculation unit 203 receives an instruction to perform recognition from the feature extractor 202 (A04), and performs calculation to determine a phoneme corresponding to the voice during the voice activity section from the feature using the speech acoustic model 250 (S13, A05). Next, the decoder 204 receives an instruction to perform recognition from the phoneme information calculation unit 203 (A06), then determines what is talked using the phonemes calculated with the phoneme information calculation unit 203 and the language model 26 (decode) (A14, A07), instructs the output unit to output the result as text (A08). The output unit 205 outputs the speech-recognized text to the outside of the speech recognition engine 200 (S15, A09).

Next, the speech recognition mode will be described using FIG. 16A, FIG. 16B, and FIGS. 18A and 18B.

In the above-described general speech recognition technique, as shown in FIG. 16A and FIG. 16B, the decoder 204 presents candidate sentences on the main memory 402 shown in FIG. 3, one of the sentences is selected, and when the voice activity ends, requests the output unit 205 to output the most probable candidate sentence (A08 in FIG. 13).

However, to perform speech recognition, it is necessary to register a large number of sentences in the language model (example: 350 MB database) and store a large number of candidates (example: 2048 candidates). Accordingly, upon presentation of the candidates, a large area is required in the main memory 402 (example: 500 MB per 1 recognition processing), and the CPU load for this purpose is heavy. Accordingly, in a call center having a large number of operators, CPU performance corresponding to the number of the operators and a large main memory capacity are required. In the example shown in FIGS. 3 and 4, the cores 412 of the CPU 410 to process recognition engine threads and the main memory 402 having a sufficient capacity are required. When the performance of the cores 412 of the CPU 410 is insufficient, or when the number of the cores 412 of the CPU 410 to process recognition engine threads is small, a process waiting line occurs, and it is not possible to perform real-time speech recognition. Further, when the area in the main memory 402 is insufficient, swapping occurs between the main memory 402 and the HDD 430, which seriously reduces the processing performance.

However, the supervisor of the call center does not desire to monitor all the calls. The supervisor desires to monitor a call having a trouble between the operator and the customer, a call showing that the operator's skill is insufficient, or the like, in a real-time manner.

The speech recognition engine 200 according to the present embodiment has at least two speech recognition modes. That is, the speech recognition engine 200 has a mode in which large consumption of the hardware resources is required for execution of the speech recognition engine 200 but a high recognition rate (high-level recognition mode) is attained, and a mode in which the consumption of the hardware resources is less but the recognition rate is low (normal mode). To execute the speech recognition engine 200 in the normal mode, it is necessary to satisfy two conditions: (1) the volume of the sentences registered in the language model 260 is reduced; and (2) the number of temporarily stored candidates is reduced.

For example, in the normal mode, as shown in FIG. 16A, when all the letters are hiragana (Japanese cursive syllabary), the number of candidates is small. In the high-level recognition mode, as shown in FIG. 16B, the number of candidates is large, while the accuracy of the speech recognition is remarkably improved.

When the output analysis unit 207 detects some abnormality in a call, e.g., when it detects a customer NG word or operator NG word a predetermined or larger number of times, the recognition mode is changed from the normal mode to the high-level recognition mode. That is, there is a tendency that when the customer is not satisfied or when the skill of the operator is insufficient, the NG words are spoken ("Not yet?", "I don't understand at all" or the like from the customer, and "I am very sorry", "I am sorry to have kept you waiting so long" or the like from the operator), and the volume of the customer's voice rises or speech overlap often occurs. Based on such tendency, the above abnormality is used as a trigger to change the recognition mode from the normal mode to the high-level recognition mode.

As shown in FIG. 18A, first, the administrator of the center can set the high-level recognition mode as a default mode (the default mode table 302 in FIG. 8) when the administrator determines that speech recognition in the high-level recognition mode is necessary because the skill of the operator is low or the operator often has a trouble. When the speech recognition server 20 receives an instruction from the center management server 10 to perform speech recognition on a call, receives a call ID and an operator ID, then refers to the default mode table 302, and based on these values, a mode management unit of the speech recognition engine in the speech recognition server 20 sets the mode of the mode control table 301.

Further, as shown in FIG. 18B, the operator NG word list (the operator NG word list 304 in FIG. 10), the customer NG word list (the customer NG word list 305 in FIG. 11), and the mode change threshold (the mode change threshold table 306 in FIG. 12) are previously set.

Next, the processing to set the speech recognition mode and the processing to change the recognition mode will be described using FIGS. 15A to 19.

In the processing in the general speech recognition engine as shown in the sequence diagram of FIG. 13, steps S10 to S13, A01 to A06 are the same as those in the processing according to the present embodiment. Hereinbelow, the processing with the decoder 204 and the subsequent steps will be described.

As shown in FIG. 15A, the decoder 204 receives a recognition start instruction from the phoneme information calculation unit 203 (A06), issues a mode acquisition request to the mode management unit 206 (S14, A20 in FIG. 15B). The mode management unit 206 refers to the mode control table 301 in FIG. 7, and returns the current mode of the call (S20, A21). The decoder 204 performs decode processing in correspondence with the current mode (A22). Next, the decoder 204 instructs the output unit 205 to output the result (A23). The output unit 205 requests the output analysis unit 207 to analyze the recognized text (A24). The output analysis unit 207 performs analysis processing on the recognized text (S22, A25). More particularly, when there is an operator NG word and a customer NG word in the text, the words are extracted, and added to the cumulative number of times of operator NG word 303c and the cumulative number of times of customer NG word 303d of the output analysis management table 303 in FIG. 9. Further, when a speech overlap and a volume sudden change appear in the call content, they are added to the cumulative number of times of overlap 303e and the cumulative number of times of volume sudden change 303f.

Then, when the respective values exceed the values in the mode change threshold table 306, the output analysis unit 207 issues a mode setting instruction (S22, A26). The mode management unit 206 receives the instruction, then rewrites the mode control table 301, to perform mode setting (S23, A27). Then the speech-recognized text is outputted (A30).

Next, the processing upon change of the speech recognition mode of the speech recognition engine from the normal mode to the high-level recognition mode will be more particularly described using FIG. 17.

The processing is the same as that by step A06 in FIG. 14 and A06 in FIG. 15A before the decoder 204 receives a recognition start instruction.

As shown in FIG. 17, the decoder 204 receives a recognition start instruction from the phoneme information calculation unit 203, then issues a mode acquisition request to the mode management unit 206 (S40, A40). The mode management unit 206 refers to the mode control table 301 in FIG. 7, and returns the current mode of the call, "normal mode" (S40, A41). The decoder 204 performs decode processing in correspondence with the normal mode (A42). Next, the decoder 204 issues an output instruction to the output unit 205 (A43). The output unit 205 requests the output analysis unit 207 to analyze the recognized text (S42, A44). The output analysis unit 207 performs analysis processing on the recognized text (S43, A45). Note that when a condition to change the speech recognition mode has occurred as a result of analysis, the output analysis unit 207 instructs the mode management unit 206 so set the "high-level recognition mode" (A46). The mode management unit 206 sets the "high-level recognition mode" in the current mode 301c of the mode control table 301 for the call (S44, A47). Then the output unit 205 outputs the speech-recognized text.

Thereafter, when the decoder 204 receives a recognition start instruction from the phoneme information calculation unit 203 and issues a mode acquisition instruction to the mode management unit 206 (S50, A60), the mode management unit 206 returns that the current mode of the call, "high-level recognition mode" (S51, A61), and the mode management unit 206 performs decode processing in the high-level recognition mode.

Next, the details of the processing to analyze the recognition result from the output analysis unit and the processing to determine the recognition mode will be described using FIG. 19.

The output analysis unit 207 searches the speech-recognized text to count the number of times of appearance of a word registered in the operator NG word list 304 (S200).

Next, the output analysis unit 207 searches the speech-recognized text to count the number of times of appearance of a word registered in the customer NG word list 305 (S201).

Next, the output analysis unit 207 searches the speech-recognized text to count the number of times of appearance of speech overlap (S202).

Next, the output analysis unit 207 searches the speech-recognized text to count the number of volume sudden change (S203).

Then the respective numbers of times obtained at steps S200 to S203 are registered in the respective corresponding fields of the output analysis management table 303 (S204).

Note that the order of the respective steps S200 to S203 is not fixed. Further, it may be configured such that every time each processing is completed, the result is registered in the output analysis management table 303.

Next, the numbers of times in the respective fields are compared with those in the corresponding fields of the mode change threshold table, to determine any of the values exceeds the threshold value (S205).

Upon determination at S205, when there is a value which exceeds the threshold value, the output analysis unit 207 instructs the mode management unit 206 to change the speech recognition mode of the call to the high-level recognition mode (S206).

Note that it may be freely configured in accordance with system items, such that the recognition mode is changed to the high-level recognition mode when two of the mode change items exceed threshold values, or the recognition mode is changed to the high-level recognition mode when all the values exceed the threshold values, as in the case of the threshold values.

Second Embodiment

Hereinbelow, a second embodiment according to the present invention will be described using FIGS. 20 and 21.

Figure 20:
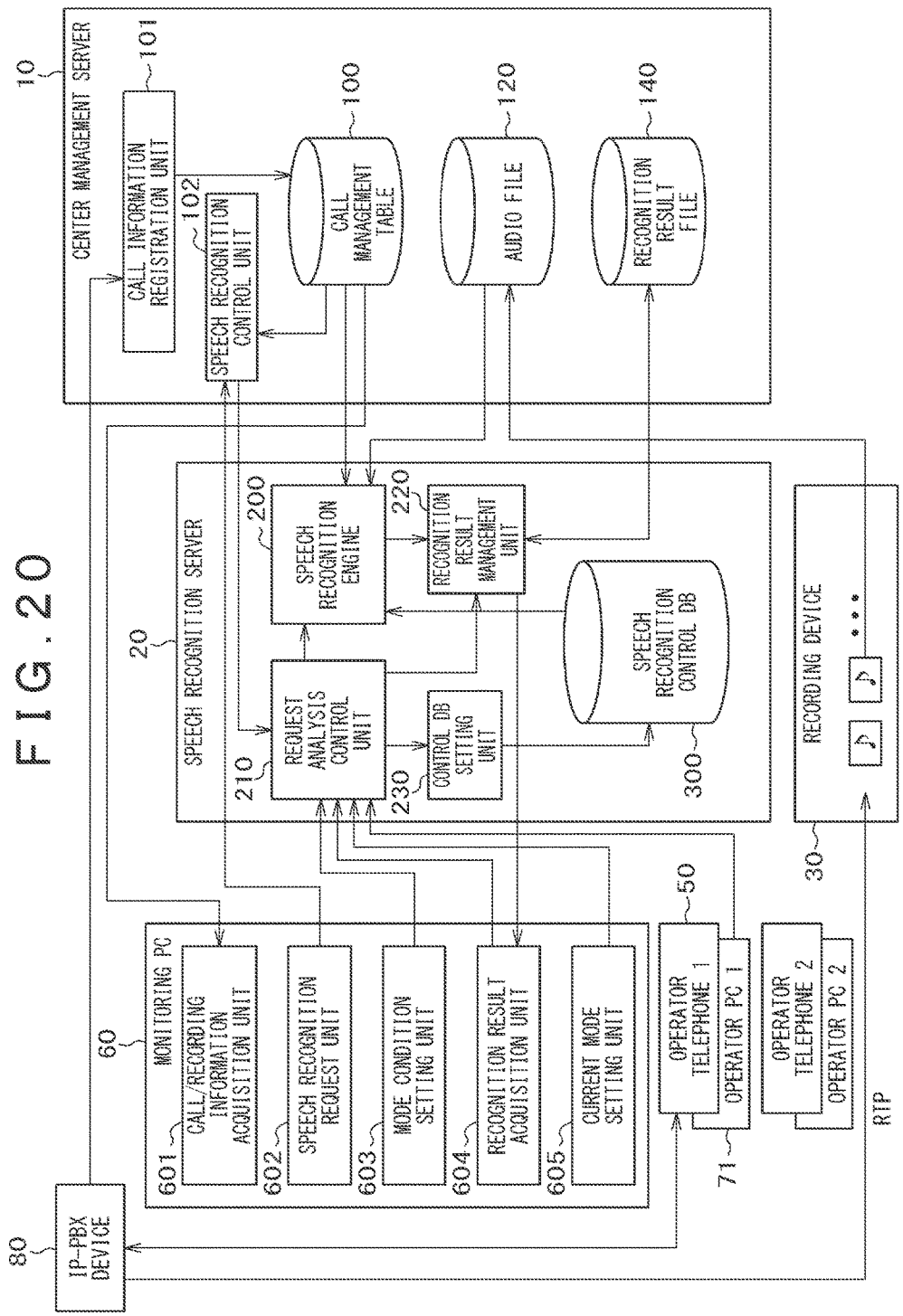
FIG. 20 is a functional block diagram of the call management system according to a second embodiment of the present invention.

FIG. 20 is a functional block diagram of the call management system according to the second embodiment.

Figure 21:
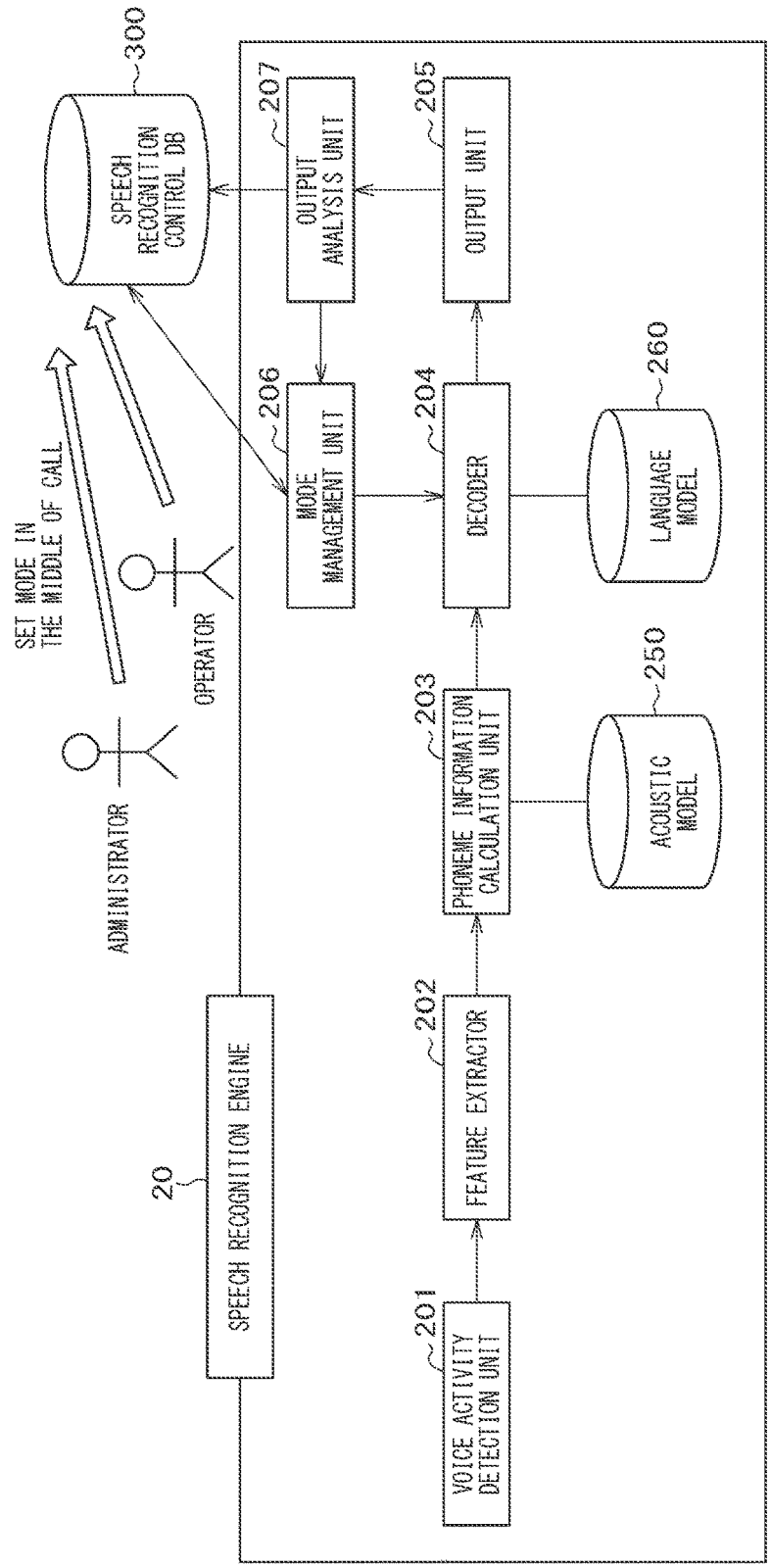
FIG. 21 is a block diagram explaining the mode setting according to the second embodiment.

FIG. 21 is a block diagram explaining the mode setting according to the second embodiment.

In the present embodiment, in addition to the first embodiment, it is possible for the operator or the supervisor to change the recognition mode in the middle of a call. For example, the following cases are given.

The operator wants the supervisor to listen to the call (the operator wants some help)

The supervisor temporarily pays attention to an operator

The supervisor checks the call content but finds no problem, then changes the recognition mode from the high-level recognition mode" to the "normal mode"

As shown in FIG. 20, in comparison with FIG. 2 in the first embodiment, the call management system according to the present embodiment has an operator PC 70, and a current mode setting unit 605 added to the monitoring PC 60.

As shown in FIG. 21, when the operator who operates the operator PC 70 or the supervisor who operates the monitoring PC 60 sets a current mode, the operator or the supervisor specifies the call ID, and transmits the recognition mode to the request analysis control unit 210 in the speech recognition server 20. The request analysis control unit 210 transmits the information to the mode management unit 206 of the speech recognition engine 200. The mode management unit 206 receives the information, and issues an instruction to set the value of the corresponding current mode 301c in the mode control table 301.

Third Embodiment

Hereinbelow, a third embodiment according to the present invention will be described using FIG. 22.

FIG. 22 is a table showing an example of a marked telephone number table.

As shown in FIG. 22, in the present embodiment, the telephone number regarding a call, originated from the telephone number in the past and the recognition mode was changed to the "high-level recognition mode", and its cumulative number of times of mode change, are respectively recorded in a telephone number 307a and a cumulative number of times of high-level recognition mode setting 307b of a marked telephone number table 307. At call start time, when a call is originated from such telephone number, regardless of default mode, the mode management unit 206 of the speech recognition engine 200, in correspondence with the records, sets the corresponding value of the current mode 301c of the mode control table 301 to the "high-level recognition mode" (S102 in FIG. 13).

With this configuration, it is possible to select an appropriate speech recognition mode in correspondence with the past history of the customer.

As described above, according to the present invention, it is possible to provide a call management system and its speech recognition control method capable of, upon speech recognition of recorded call content, suppressing hardware resource consumption while efficiently operating the call management system.

What is claimed is:

1. A call management system for recording a call from an external line, performing speech-recognition, speech-to-text converting the call, and displaying text, comprising:
a speech recognition server that performs speech recognition on recording data of call data including audio data, and outputs text data,
wherein the speech recognition server includes:
one or more processors which are configured to execute a speech recognition engine that performs speech recognition on the audio data and speech-to-text converts the data; and
a memory configured to store a mode control table that holds a speech recognition mode for each call,
wherein the speech recognition engine includes:
a mode management unit that designates a speech recognition mode for a decoder; and
an output analysis unit that analyzes recognition result data that is speech-to-text converted by the speech recognition,
wherein the output analysis unit designates the speech recognition mode for the mode management unit based on the result of analysis of the recognition result data that is speech-to-text converted by the speech recognition,
wherein the mode management unit rewrites the speech recognition mode held in the mode control table based on the designation with the output analysis unit for each call, and designates the speech recognition mode for the decoder based on the speech recognition mode held in the mode control table for each call,
wherein, in a first mode of the speech recognition, the decoder reduces the number of language models to be referred to, and reduces the number of candidates to be presented as an intermediate result, and
wherein, in a second mode of the speech recognition, the decoder increases the number of language models to be referred to, and increases the number of candidates to be presented as the intermediate result.

2. The call management system according to claim 1, wherein the memory is further configured to store:
an NG word list including an NG word that appears in a call;
a mode change threshold table that holds a threshold value for appearance of the NG word in the NG word list; and
an output analysis management table that holds a cumulative number of times of appearance of the NG word, for each call,
wherein the output analysis unit records the cumulative number of times of appearance of the NG word in the NG word list that appears in the recognition result data, that is speech-to-text converted by the speech recognition, in the output analysis management table, for each call,
wherein the output analysis unit refers to the output analysis management table, and when the cumulative number of times of appearance of the NG word exceeds the threshold value for appearance of the NG word in the NG word list in the mode change threshold table, instructs the mode management unit to change the speech recognition mode from the first mode to the second mode, for each call.

3. The call management system according to claim 1, wherein the memory is further configured to store:
a mode change threshold table that holds thresholds for the number of times of appearance of speech overlap, and the number of times of volume sudden change; and
an output analysis management table that holds a cumulative number of times of appearance of speech overlap and a cumulative number of times of volume sudden change, for each call,
wherein the output analysis unit records the cumulative number of times of appearance of speech overlap in the recognition result data that is speech-to-text converted by the speech recognition and the cumulative number of times of volume sudden change, in the output analysis management table, for each call, and
wherein the output analysis unit refers to the output analysis management table, and when the cumulative number of times of appearance of speech overlap and the cumulative number of times of volume sudden change respectively exceed the threshold values for the number of times of appearance of speech overlap and the number of times of volume sudden change, in the mode change threshold table, for each call, instructs the mode management unit to change the speech recognition mode from the first mode to the second mode.

4. The call management system according to claim 1, wherein the memory is further configured to store a marked telephone number table that holds a cumulative number of times of mode change to the second recognition mode in the past, by telephone number,
wherein, when a caller number of a call subjected to the speech recognition is a telephone number in the marked telephone number table and the cumulative number of times of recognition mode change to the second recognition mode exceeds a predetermined threshold value, the mode management unit of the speech recognition engine in the speech recognition server rewrites the speech recognition mode of the mode control table to the second recognition mode.

5. A call management for recording a call from an external line, performing speech-recognition, speech-to-text converting the call, and displaying text, comprising:
a speech recognition server that performs speech recognition on recording data of call data, and outputs text data,
wherein the speech recognition server includes:
one or more processors which are configured to execute a speech recognition engine that performs speech recognition on audio data and speech-to-text converts the data; and
a memory configured to store a mode control table that holds a speech recognition mode for each call,
wherein the speech recognition engine includes:
a mode management unit that designates a speech recognition mode for a decoder; and
an output analysis unit that analyzes recognition result data that is speech-to-text converted by the speech recognition,
wherein the output analysis unit designates the speech recognition mode for the mode management unit based on the result of analysis of the recognition result data that is speech-to-text converted by the speech recognition, wherein the mode management unit rewrites the speech recognition mode held in the mode control table based on the designation with the output analysis unit for each call, and designates the speech recognition mode for the decoder based on the speech recognition mode held in the mode control table for each call, wherein the memory is further configured to store a default mode table that holds a default speech recognition mode by operator, wherein the mode control table further holds an operator ID for identification of the operator, for each call, and wherein, for each call, when the operator ID of the operator is registered in the default mode table, the mode management unit rewrites the default speech recognition mode in the default mode table with the speech recognition mode in the mode control table at the beginning of the speech recognition.

6. The call management system according to claim 5, further comprising:

a monitoring PC or operator PC configured to set a speech recognition mode in the speech recognition server, wherein the mode management unit of the speech recognition engine in the speech recognition server rewrites the speech recognition mode in the mode control table with the mode of the speech recognition engine set from the monitoring PC or operator PC.

7. The call management system according to claim 5, further comprising:

a management server has configured to store a call management table holding the relationship among a call ID, an operator ID, and a recorded audio file, wherein the call management server is further configured to issue a speech recognition instruction related to a call to the speech recognition server, with the call ID and the operator ID as parameters.

8. A speech recognition control method for a call management system for recording a call from an external line, performing speech-recognition, speech-to-text converting the call, and displaying text, wherein the call management system has a speech recognition server that performs speech recognition on recording data of call data including audio data and outputs text data, and wherein the speech recognition server includes:

one or more processors which are configured to execute a speech recognition engine that performs speech recognition on the audio data and speech-to-text converts the data; and a memory configured to store a mode control table that holds a speech recognition mode for each call, wherein the speech recognition engine includes:

a mode management unit that designates a speech recognition mode for a decoder, and an output analysis unit that analyzes recognition result data that is speech-to-text converted by the speech recognition, the speech recognition control method comprising:

reducing, by the decoder and in a first mode of the speech recognition, a number of language models to be referred to, and reducing a number of candidates to be presented as an intermediate result; and increasing, by the decoder and in a second mode of the speech recognition, the number of language models to be referred to, and increasing the number of candidates to be presented as the intermediate result.

9. The speech recognition control method for the call management system according to claim 8, wherein the memory is further configured to store:

an NG word list including an NG word that appears in a call;

a mode change threshold table that holds a threshold value for appearance of the NG word in the NG word list; and an output analysis management table that holds a cumulative number of times of appearance of the NG word, for each call;

and the speech recognition control method further comprising:

recording a cumulative number of times of appearance of the NG word recorded in the NG word list that appears in the recognition result data that is speech-to-text converted by the speech recognition, in the output analysis management table, with the output analysis unit, for each call; and referring to the output analysis management table, and when the cumulative number of times of appearance of the NG word exceeds the threshold value for appearance of the NG word in the NG word list in the mode change threshold table, instructing the mode management unit to change the speech recognition mode from the first mode to the second mode, with the output analysis unit, for each call.

10. The speech recognition control method for the call management system according to claim 8, wherein the memory is further configured to store:

a mode change threshold table that holds thresholds for the number of times of appearance of speech overlap, and the number of times of volume sudden change; and an output analysis management table that holds a cumulative number of times of appearance of speech overlap and a cumulative number of times of volume sudden change, for each call, and the speech recognition control method further comprising:

recording the cumulative number of times of appearance of speech overlap in the recognition result data that is speech-to-text converted by the speech recognition and the cumulative number of times of volume sudden change in the output analysis management table, with the output analysis unit, for each call; and referring to the output analysis management table and when the cumulative number of appearance of speech overlap and the cumulative number of volume sudden change respectively exceed the threshold values for the number of times of appearance of speech overlap and the number of times of volume sudden change in the mode change threshold table, instructing the mode management unit to change the speech recognition mode from the first mode to the second mode, with the output analysis unit, for each call.

11. A call management system for recording a call from an external line, performing speech-recognition, speech-to-text converting the call, and displaying text, comprising:

a speech recognition server that performs speech recognition on recording data of call data, and outputs text data, wherein the speech recognition server includes:

one or more processors which are configured to execute a speech recognition engine that performs speech recognition on audio data and speech-to-text converts the data; and a memory configured to store a mode control table that holds a speech recognition mode for each call, wherein the speech recognition engine includes:
a mode management unit that designates a speech recognition mode for a decoder; and
an output analysis unit that analyzes recognition result data that is speech-to-text converted by the speech recognition,
wherein the output analysis unit designates the speech recognition mode for the mode management unit, based on the result of analysis of the recognition result that is data speech-to-text converted by the speech recognition,
wherein the mode management unit rewrites the speech recognition mode held in the mode control table based on the designation with the output analysis unit, for each call, and designates the speech recognition mode for the decoder based on the speech recognition mode held in the mode control table, for each call, and
wherein the mode control table defines the speech recognition mode which includes a normal mode where a processing load on the speech recognition engine is relatively light and a high-level recognition mode where the processing load is heavier in comparison with the normal mode.

12. The call management system according to claim 11, wherein the memory is further configured to store a default mode table that holds a default speech recognition mode by operator,
wherein the mode control table holds an operator ID for identification of the operator, for each call, and
wherein, for each call, when the operator ID of the operator is registered in the default mode table, the mode management unit rewrites the default speech recognition mode in the default mode table with the speech recognition mode in the mode control table, at the beginning of the speech recognition.

13. The call management system according to claim 11, further comprising:
a monitoring PC or operator PC configured to set a speech recognition mode in the speech recognition server,
wherein the mode management unit of the speech recognition engine in the speech recognition server rewrites the speech recognition mode in the mode control table with the mode of the speech recognition engine set from the monitoring PC or operator PC.

14. The call management system according to claim 11, further comprising:
a management server configured to store a call management table holding the relationship among a call ID, an operator ID, and a recorded audio file,
wherein the call management server is further configured to issue a speech recognition instruction related to a call to the speech recognition server, with the call ID and the operator ID as parameters.

15. A speech recognition control method for a call management system for recording a call from an external line, performing speech-recognition, speech-to-text converting the call, and displaying text,
wherein the call management system has a speech recognition server that performs speech recognition on recording data of call data and outputs text data,
and wherein the speech recognition server includes:
one or more processors which are configured to execute a speech recognition engine that performs speech recognition on the audio data and speech-to-text conversion; and
a memory configured to store a mode control table that holds the speech recognition mode for each call,
wherein the speech recognition engine includes:
a mode management unit that designates a speech recognition mode for a decoder; and
an output analysis unit that analyzes recognition result data that is speech-to-text converted by the speech recognition,
the speech recognition control method comprising:
designating the speech recognition mode for the mode management unit based on the result of analysis of the recognition result data that is speech-to-text converted by the speech recognition; and
rewriting the speech recognition mode held in the mode control table in accordance with the instruction from the output analysis unit, with the mode management unit, for each call,
wherein the mode management unit designates the speech recognition mode for the decoder in accordance with the speech recognition mode held in the mode control table, for each call, and
wherein the mode control table defines the speech recognition mode which includes a normal mode where a processing load on the speech recognition engine is relatively light and a high-level recognition mode where the processing load is heavier in comparison with the normal mode.

16. The speech recognition control method for the call management system according to claim 15,
wherein the memory is further configured to store a default mode table that holds a default speech recognition mode by operator,
and the mode control table holds an operator ID for identification of the operator, for each call, and
wherein, for each call, when the operator ID of the operator is registered in the default mode table, the mode management unit rewrites the default speech recognition mode in the default mode table with the speech recognition mode in the mode control table, at the beginning of the speech recognition.

17. The speech recognition control method for the call management system according to claim 15, further comprising:
a monitoring PC or operator PC configured to set a speech recognition mode in the speech recognition server,
wherein the mode management unit of the speech recognition engine in the speech recognition server rewrites the speech recognition mode in the mode control table with the mode of the speech recognition engine set from the monitoring PC or operator PC.

18. The speech recognition control method for the call management system according to claim 15, further comprising:
a management server configured to store a call management table holding the relationship among a call ID, an operator ID, and a recorded audio file,
wherein the call management server is further configured to issue a speech recognition instruction related to a call to the speech recognition server, with the call ID and the operator ID as parameters.

* * * * *